(12) United States Patent
Nease et al.

(10) Patent No.: US 7,525,034 B2
(45) Date of Patent: Apr. 28, 2009

(54) METHOD AND APPARATUS FOR IMAGE INTERPRETATION INTO SOUND

(76) Inventors: Joseph L. Nease, 20905 W. 69th Ter., Shawnee, KS (US) 66218; Karen Owsley Nease, 20905 W. 69th Ter., Shawnee, KS (US) 66218

( * ) Notice: Subject to any disclaimer, the term of this patent is extended or adjusted under 35 U.S.C. 154(b) by 677 days.

(21) Appl. No.: 11/121,895

(22) Filed: May 4, 2005

(65) Prior Publication Data

US 2006/0132714 A1 Jun. 22, 2006

Related U.S. Application Data

(60) Provisional application No. 60/637,182, filed on Dec. 17, 2004.

(51) Int. Cl.
*G10H 1/00* (2006.01)
*G06K 9/40* (2006.01)

(52) U.S. Cl. .................. 84/485 R; 84/601; 84/615; 84/626; 84/647; 382/100; 382/107; 382/190; 382/274

(58) Field of Classification Search ............... 382/100, 382/190, 107, 274; 84/600–616, 622, 623, 84/647, 649–655, 659–661, 485 R
See application file for complete search history.

(56) References Cited

U.S. PATENT DOCUMENTS

| | | | | |
|---|---|---|---|---|
| 4,658,427 A | * | 4/1987 | Aubin | 381/124 |
| 4,903,312 A | * | 2/1990 | Sato | 382/170 |
| 5,159,140 A | * | 10/1992 | Kimpara et al. | 84/600 |
| 5,471,009 A | * | 11/1995 | Oba et al. | 84/645 |
| 5,684,259 A | * | 11/1997 | Horii | 84/600 |
| 5,689,078 A | * | 11/1997 | McClard | 84/600 |
| 6,084,169 A | * | 7/2000 | Hasegawa et al. | 84/600 |
| 6,140,565 A | * | 10/2000 | Yamauchi et al. | 84/600 |
| 6,686,529 B2 | | 2/2004 | Kim | |
| 6,687,382 B2 | * | 2/2004 | Nagahara et al. | 382/100 |
| 2002/0114511 A1 | * | 8/2002 | Kim | 382/162 |
| 2003/0225626 A1 | * | 12/2003 | Sanders | 705/26 |

\* cited by examiner

*Primary Examiner*—Jeffrey Donels
*Assistant Examiner*—Christopher Uhlir
(74) *Attorney, Agent, or Firm*—Erickson, Kernell, Derusseau & Kleypas, LLC

(57) ABSTRACT

A method for interpreting an image into sound is provided and includes scanning an image to provide a plurality of scanned elements which are assigned a value and an associated sound element. The sound elements are arranged to produce a sound track for the scanned image.

37 Claims, 24 Drawing Sheets
(18 of 24 Drawing Sheet(s) Filed in Color)

METHOD AND APPARATUS FOR IMAGE INTERPRETATION INTO SOUND

CROSS REFERENCE TO RELATED APPLICATION

This application claims the benefit of application Ser. No. 60/637,182 filed Dec. 17, 2004.

FIELD OF THE INVENTION

The present invention relates to a method and apparatus for relating images and sounds and, more particularly, to a method and apparatus for providing an interpretation of an image and presenting that interpretation as sound data.

BACKGROUND OF THE INVENTION

Creators of visual images in the form of photographs, video, paintings, sculptures, architecture, consumer or industrial products, or photographic or video documentation of these, for example, have control over the visual presentation of their work. However, heretofore sound interpretation of the work has been performed separately and removed from direct interpretation of the work. Another individual may provide his or her own interpretation of the work in the form of a musical score or other sound recording to accompany the work when displayed. Often the work is displayed without accompanying music or other sound data or is simply paired with preexisting music created unrelated to the visual work.

Various attempts have been made to provide a conversion of an image to sound. However, these methods have often simply matched colors to notes or notes to colors which are played in a predetermined sequence without regard to the visual interpretation of the work or the creator's sound interpretation. Additionally, visual and the subsequent sound interpretation of visual images is highly subjective according to the intended meaning and presentation of the creator and thus is not readily disposed to a simple translation process.

Accordingly, there is a need for a method and apparatus which enables a user to develop a sound directly from data derived from one or more images which reflects the user's interpretation of the image.

SUMMARY OF THE INVENTION

The present invention provides a method and apparatus to analyze and interpret digital images at a variety of levels of detail from overall impression down to an individual pixel. The resulting digital interpretation and resulting data may then be interpreted using a variety of predetermined and user-defined schemes to generate digital sound data. The sound data may be used as generated to output sound or may be further manipulated or combined on various other levels or edited using sound editing software.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION

The present invention provides a method and apparatus for image to sound interpretation. An original soundtrack may be produced based on an interpretation of a still digital image or series of digital images in a video or slide presentation, for example. Similar images may be interpreted to produce a similar soundtrack or sound. Images that are related may be interpreted to produce related but different sounds. Sound samples or notes, for example, may be mapped to a specific color and thus be used as an analog for that color when interpreting an image. Certain aspects of an image may be selectively emphasized to highlight or direct the interpretation of the image as presented in sound.

The present invention provides a means for an artist to create a royalty-free soundtrack of his or her own work. The user may emphasize in the soundtrack what he or she wanted to emphasize in the work. The present invention also allows for a non-emotional, objective interpretation of the work in the same way that the artist's material can be non-emotional.

Figure 1:
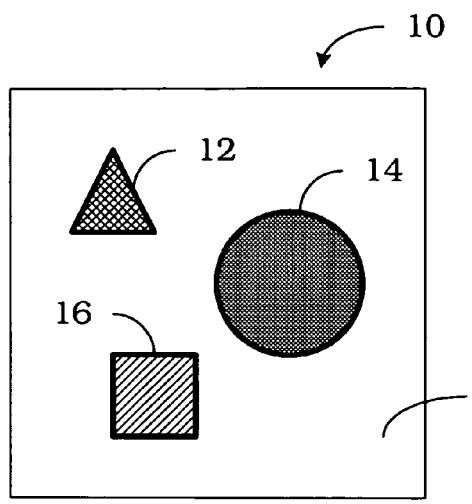
FIG. 1 is a diagrammatic illustration of a digital image with simple shapes.

Referring to FIG. 1, a simple diagrammatic illustration of three objects is generally indicated by reference numeral 10. The user begins by opening an image file to display image 10 which consists of a triangle 12, circle 14 and square 16 on a background 18. Each of the shapes may be a different color or have a different texture. The user may select the method of analysis by choosing the order and type of scan and the scan resolution, for example. Resolution may be used to vary the length of the soundtrack, or length may be determined by a user-defined looping or length. At this point the user may select the default settings and the system will generate a soundtrack based on the scanned images.

A value may be assigned to each single pixel or group of pixels depending on the resolution and characteristics such as color, saturation, darkness, brightness and relationship to surrounding pixels, in a process referred to as sonelization. This value is converted to a sound element or sonel and assigned a sound based on application defaults or user presets. Each sonel may include a color value and a grayscale value, for example. A group of sonels may then be ordered to produce a soundtrack.

Through the default settings for sound or user entered sounds, each sonel may be assigned a sound based on its value. The intensity of the color or grayscale value assigned or associated with a particular sonel may be used to determine the volume or loudness of the sound. Abruptness in grayscale changes from one sonel to the next may be used to determine a rhythm when sonels are placed in a soundtrack order based on the scanning choice.

An object sonel, such as the triangle 12, circle 14 or square 16 may be defined by selecting the object from a menu of geometric shapes and positioning the object over an area of the image, or defined by a user-created polygonal or curved shape positioned over an area of the image, which is then analyzed and assigned a sonel value.

A field sonel, such as area 18, for an area of color or an image's overall color, may be defined by selection of the field and resolution to use for analysis. The average value for all the points selected at a resolution is calculated to determine the sonel value for the selected field.

Figure 2:
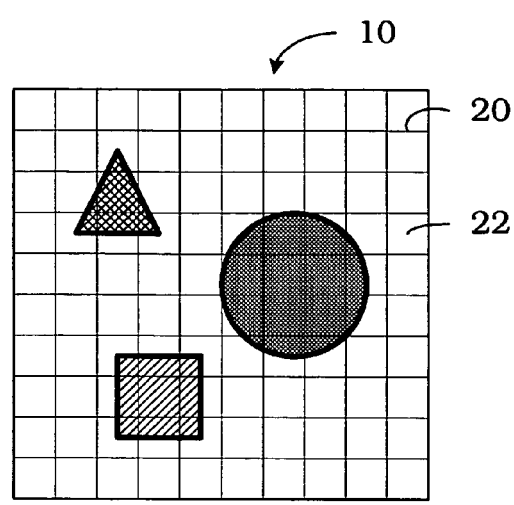
FIG. 2 is the image of FIG. 1 with grid lines.

Referring to FIG. 2, a grid 20 according to the resolution selected by the user may be placed over the image 10 and the scan order selected such as left to right and top to bottom, for example. A value is assigned to each single pixel or group of pixels within a grid square 22 depending on the resolution, based on the pixels or group of pixels characteristics such as color, saturation, darkness, brightness and relationship to surrounding pixels. The image 10 is divided or gridded into a 10×10 grid 20, for example. Starting in the upper left and proceeding left to right and top to bottom the image 10 may be sonelized for each grid square 22. Each square 22 of the grid 20 may be associated with a sonel. Going from upper left to lower right, a series of 100 sounds (or small tune of 100 notes) may be generated from the colors and the rhythm established by the abruptness in the change of brightness/darkness. Various default settings, user presets and plug-ins may be used to determine how the image 10 is interpreted and how the sonels are used to produce sound. This allows the user further control over their creative process. This "soundtrack" may then be further manipulated by sound editing software.

Figure 3:
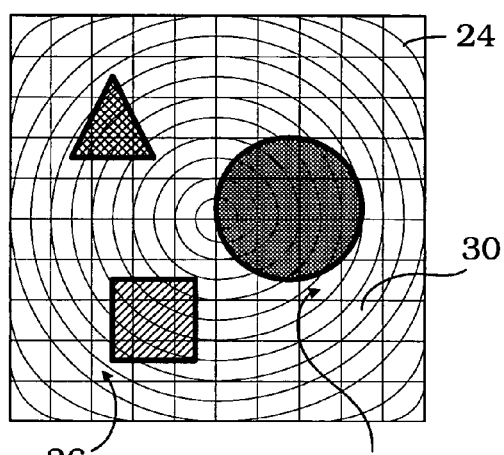
FIG. 3 is the image of FIG. 2 with a spiral sonel order.

Referring to FIG. 3, a longer sound track may be produced by ordering sonels from a spiral pattern 24 beginning in the center of the image 10 and emanating outwardly. The sonel may be determined based on the cells 22 of the grid 20, or may be determined based on the various shapes formed from the intersection of the spiral 24 and the grid 20. In the former example, a particular sonel may be used multiple times within an order. For instance, the sonel for grid square 26 may be placed in the order three times corresponding to each intersection of the spiral 24 with grid square 26. In the latter example, a grid square 28 may be divided into four areas each of which may receive a different sonel value. In this example, each of the four sonels would have a different sonel value, where each of the four sonels within grid square 30 would have the same sonel value.

Figure 4:
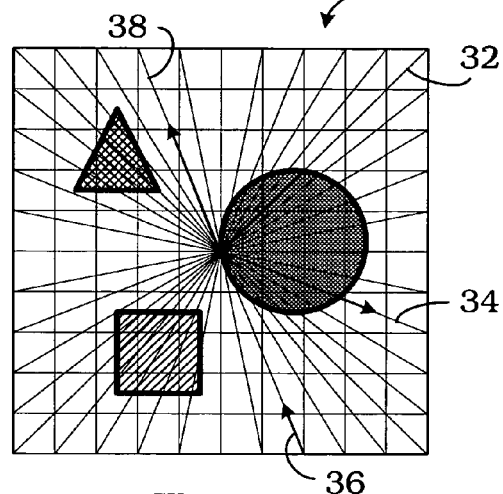
FIG. 4 is the image of FIG. 2 with a radial sonel order from the image center.

Referring to FIG. 4, a radial pattern 32 may be used to order sonels from the center of the image 10 outwardly and clockwise or counterclockwise, if the center is the focal point of the image 10, for example. Each sonel may be determined based on the cells 22 of grid 20, or may be determined from the various shapes or areas created by the intersection of the radial pattern 32 and the grid 20. The user has complete control over the ordering of sonels. The order may be determined by following a radial line 34 from the center of the image 10 and then from the edge of the image 10 along line 36 to the center and back out along line 38, for example.

Figure 5:
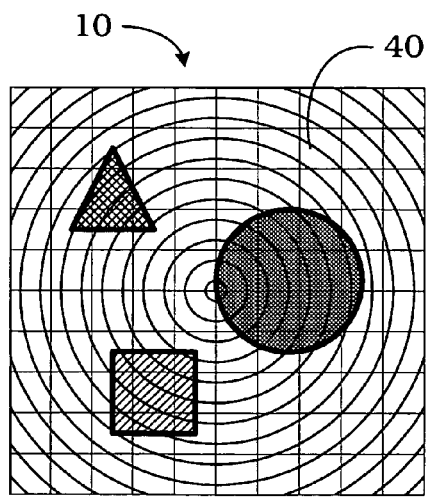
FIG. 5 is the image of FIG. 2 with a concentric rings sonel order.

Referring to FIG. 5, a concentric ring pattern 40 may be used to order sonels from the center of the image 10 outwardly and clockwise or counterclockwise, for example. A sonel for each concentric ring may also be determined and ordered outwardly or inwardly to the center of the image 10.

Figure 6:
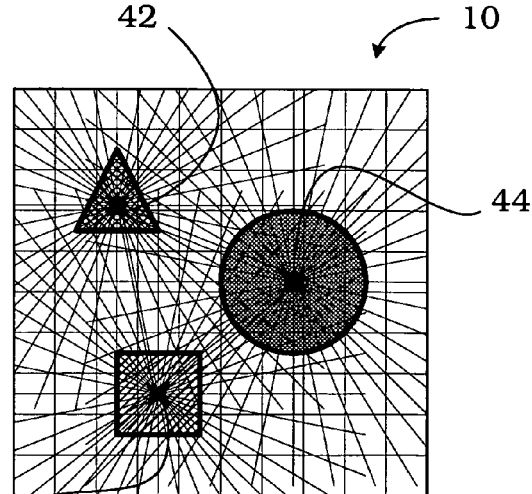
FIG. 6 is the image of FIG. 2 with a radial sonel order from the center of each shape.

Referring to FIG. 6, radial patterns 42, 44 and 46 extending from shapes 12, 14 and 16, respectively, may be used to order sonels according to the focal point of an image and then extending outwardly to other focal points. A relatively complex pattern of image areas formed from the intersection of the radial patterns 42, 44 and 46 and optionally grid 20 may be used from which the sonels may be determined. The sonels may be ordered starting with shape 14 then continuing to shape 16 and shape 12, for example, however the creator of image 10 wishes to express the sounds associated with the image 10.

Using these patterns or other patterns, a longer soundtrack for a single image may be created. A more complex grid of several hundred or thousands of squares or other shapes may be created and analyzed linearly (in numerous directions) concentrically, radially, etc. or user ordered, or follow intra-image shapes, for example. Higher resolution would allow more analyses of detail such as brushstrokes for instance, which may provide changes in rhythm. One type of preset may have a quiet sunset image producing a pleasant soundtrack with fewer rhythmic changes and less tonal change than an urban street scene with a variety of colors and contrast, for example. The opposite of the typical preset may also be used for an abstract unexpected effect. Presets that are designated for a sonel based on shape or brushstroke, texture variance, may be used to provide other analytical uses.

Referring to FIGS. 7-12, six different Monet Sunrise paintings are illustrated with a grid 48 dividing the images into square areas. Sonels ordered in the same manner for each of the paintings to produce corresponding musical compositions would sound very similar as though one composer wrote them because the program would analyze and find similarities in color, brush strokes, value, composition, repetitive shapes movement of eye across the canvas. In this case, the sound or music would be very much alike such as in the same key, same general rhythm and feel.

Figure 7:
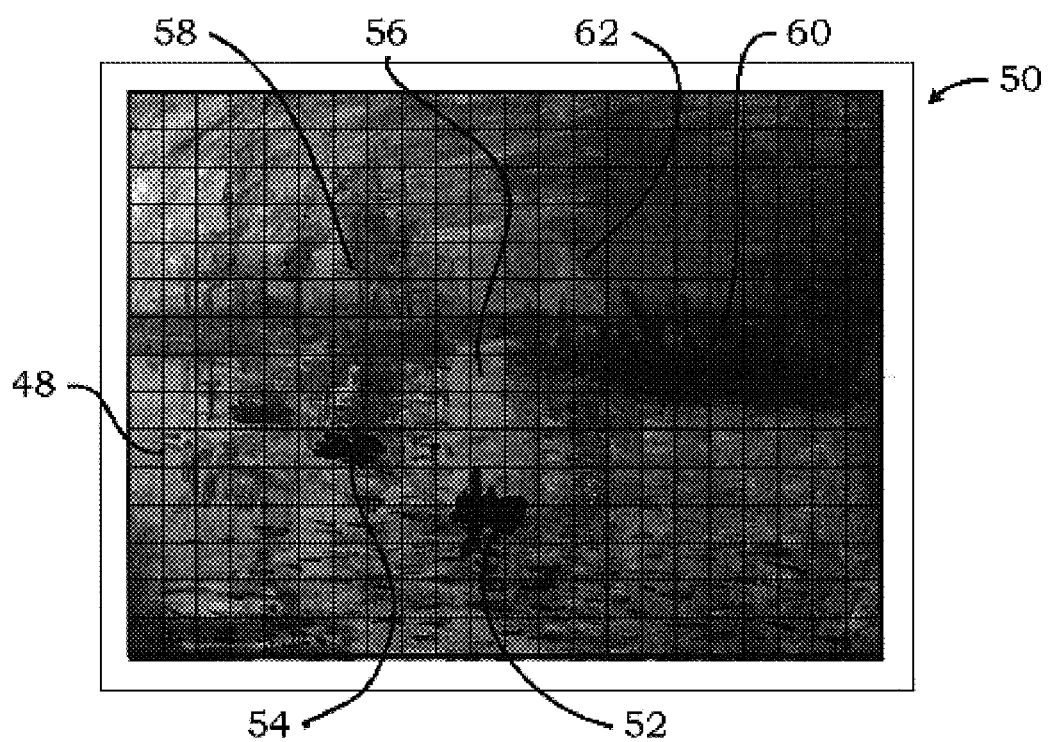
FIGS. 7-12 are digital images of Claude Monet's Sunrise series paintings.

Referring to FIG. 7, the first Monet Sunrise painting is generally indicated by reference numeral 50. A small boat with a fisherman 52 is in the foreground of the painting 50, another boat 54 is to the left, the Thames River 56 fades into the background between smoke stacks and factories 58 and 60. The sun 62 is just above the factories 60.

Figure 8:
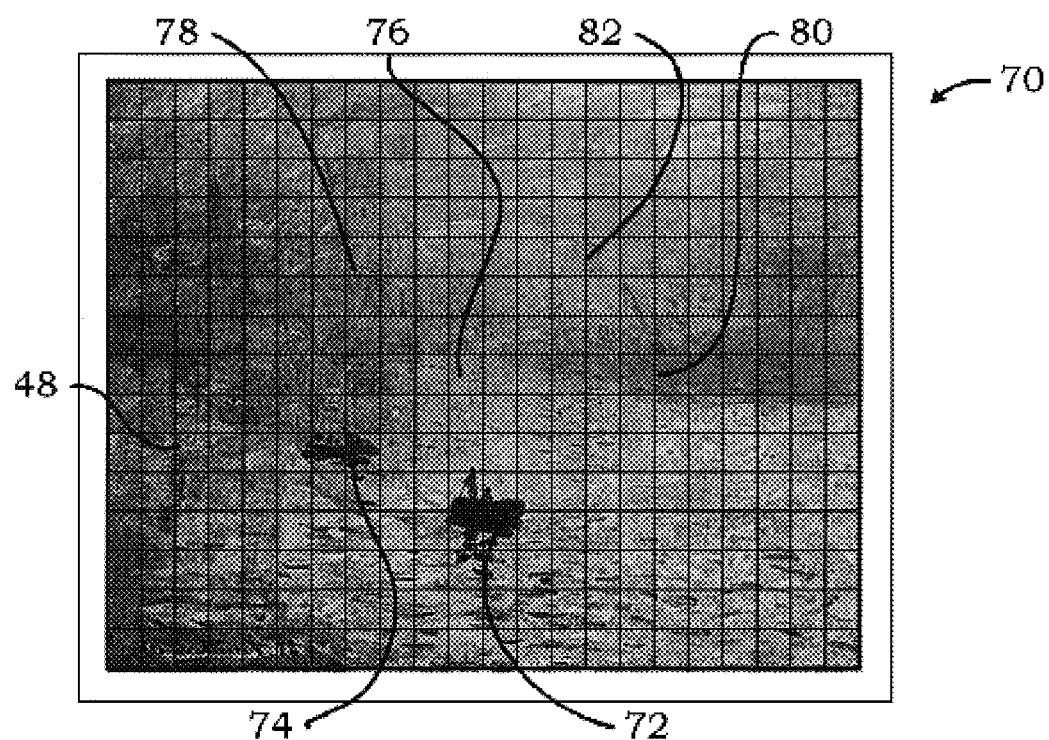

Referring to FIG. 8, the second Monet Sunrise painting is generally indicated by reference numeral 70. A small boat with a fisherman 72 is in the foreground of the painting 70, another boat 74 is to the left, the Thames River 76 fades into the background between smoke stacks and factories 78 and 60. The sun 82 is just above the factories 80.

Figure 9:
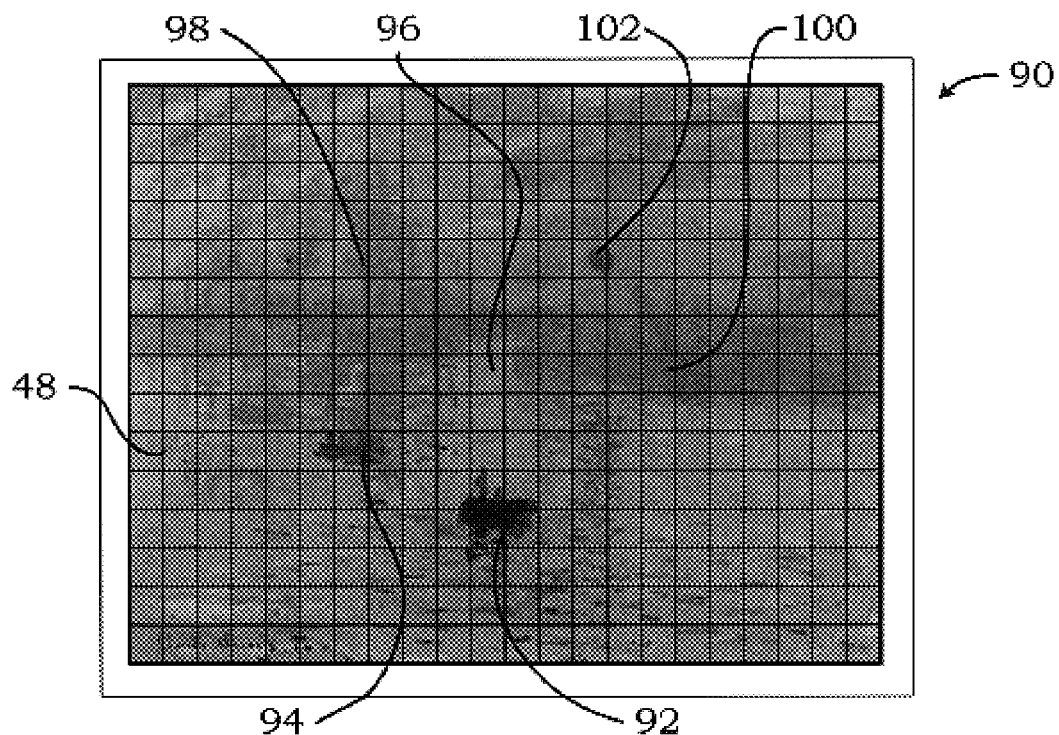

Referring to FIG. 9, the third Monet Sunrise painting is generally indicated by reference numeral 90. A small boat with a fisherman 92 is in the foreground of the painting 90, another boat 94 is to the left, the Thames River 96 fades into the background between smoke stacks and factories 98 and 100. The sun 102 is just above the factories 100.

Figure 10:
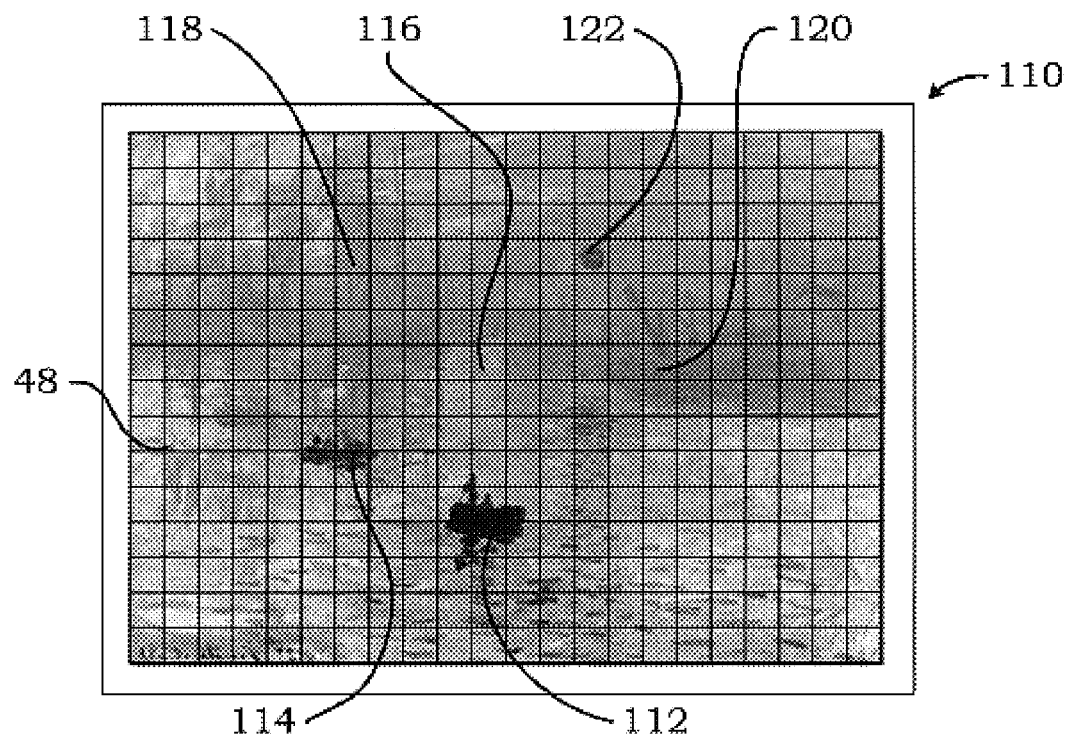

Referring to FIG. 10, the fourth Monet Sunrise painting is generally indicated by reference numeral 110. A small boat with a fisherman 112 is in the foreground of the painting 110, another boat 114 is to the left, the Thames River 116 fades into the background between smoke stacks and factories 118 and 120. The sun 122 is just above the factories 120.

Figure 11:
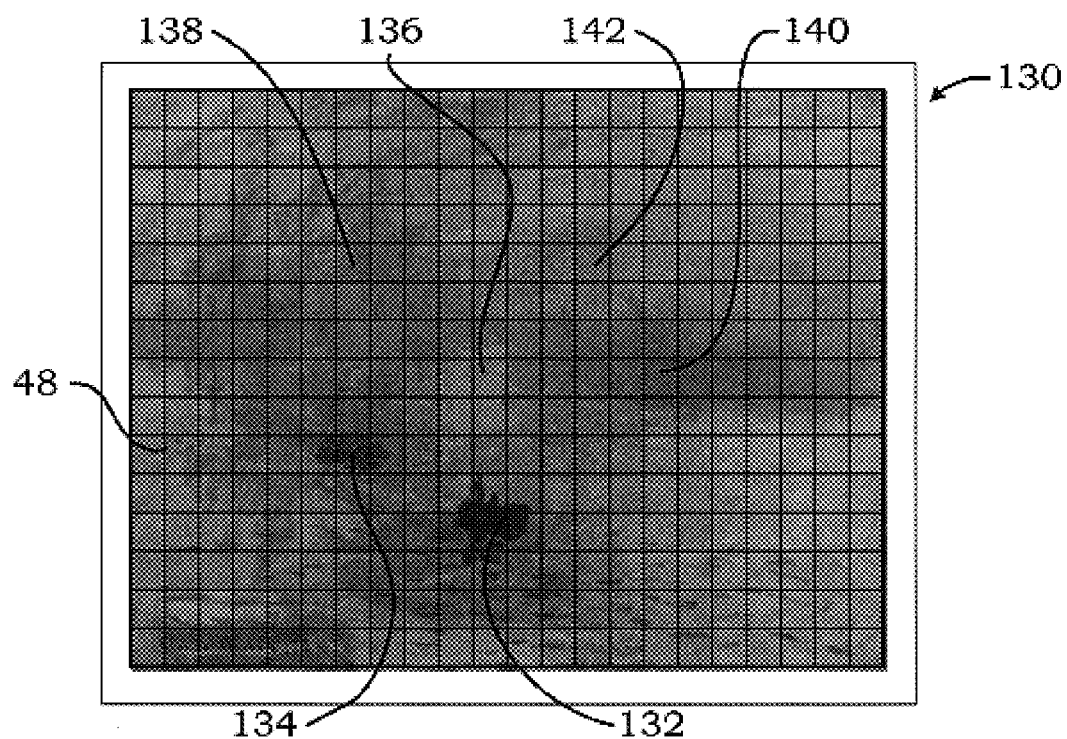

Referring to FIG. 11, the fifth Monet Sunrise painting is generally indicated by reference numeral 130. A small boat with a fisherman 132 is in the foreground of the painting 130, another boat 134 is to the left, the Thames River 136 fades into the background between smoke stacks and factories 138 and 140. The sun 142 is just above the factories 140.

Figure 12:
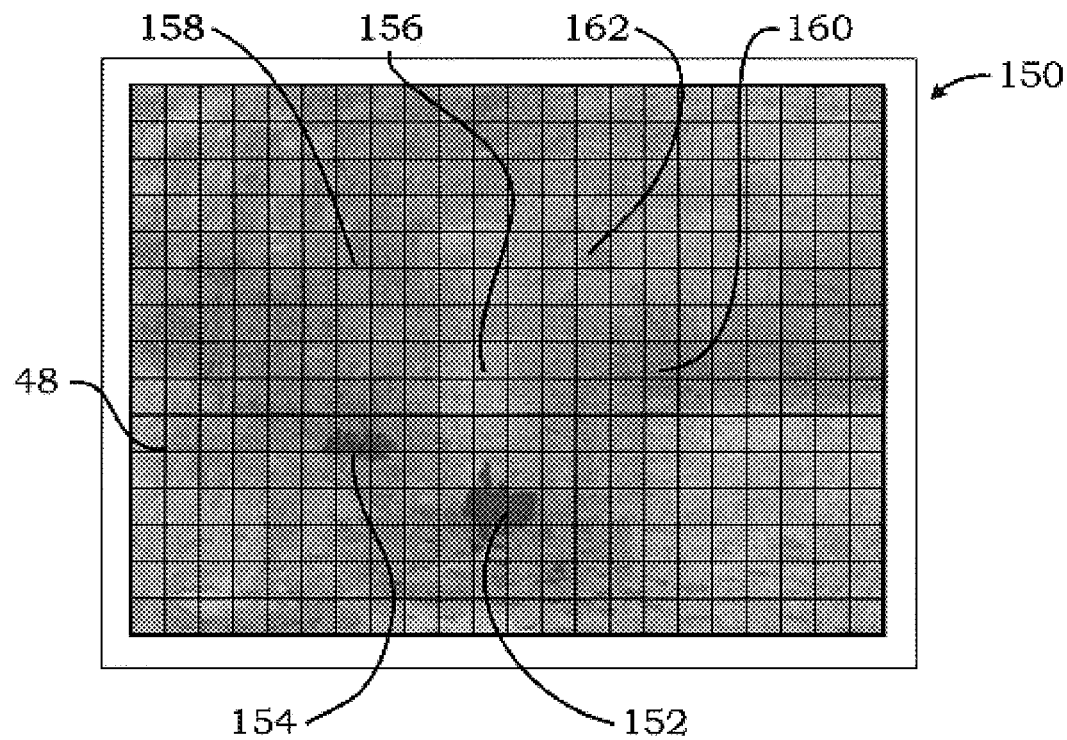
Figure 13:
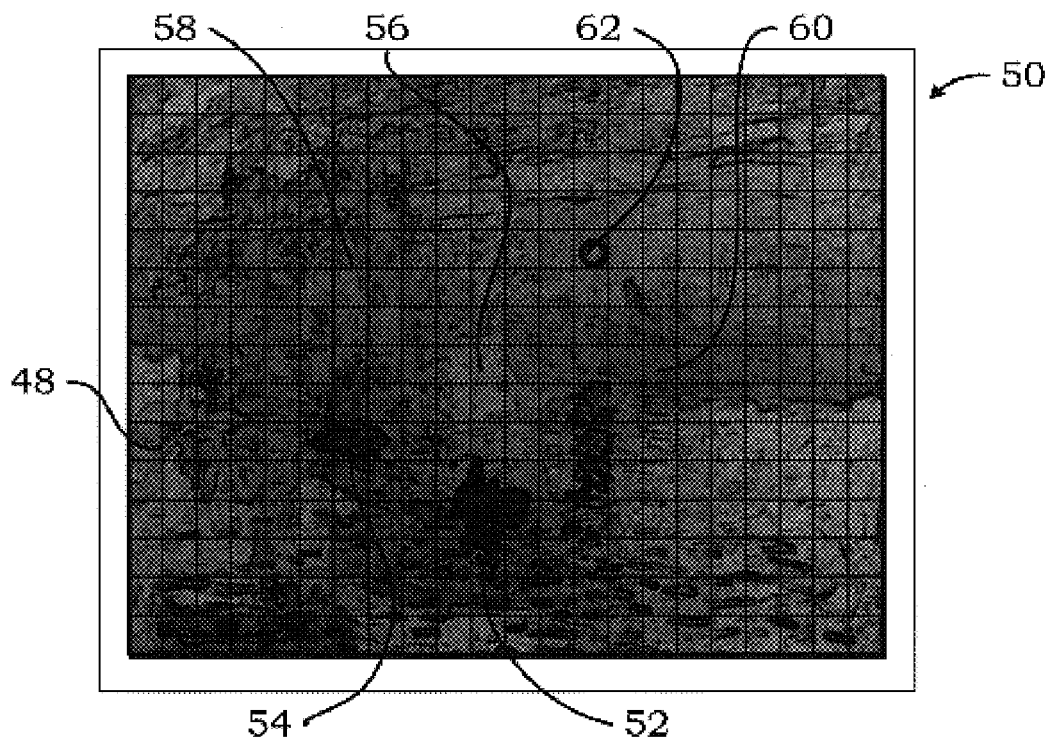
FIGS. 13-18 are digital images of FIGS. 7-12 respectively showing object shapes and features in the digital images.
Figure 14:
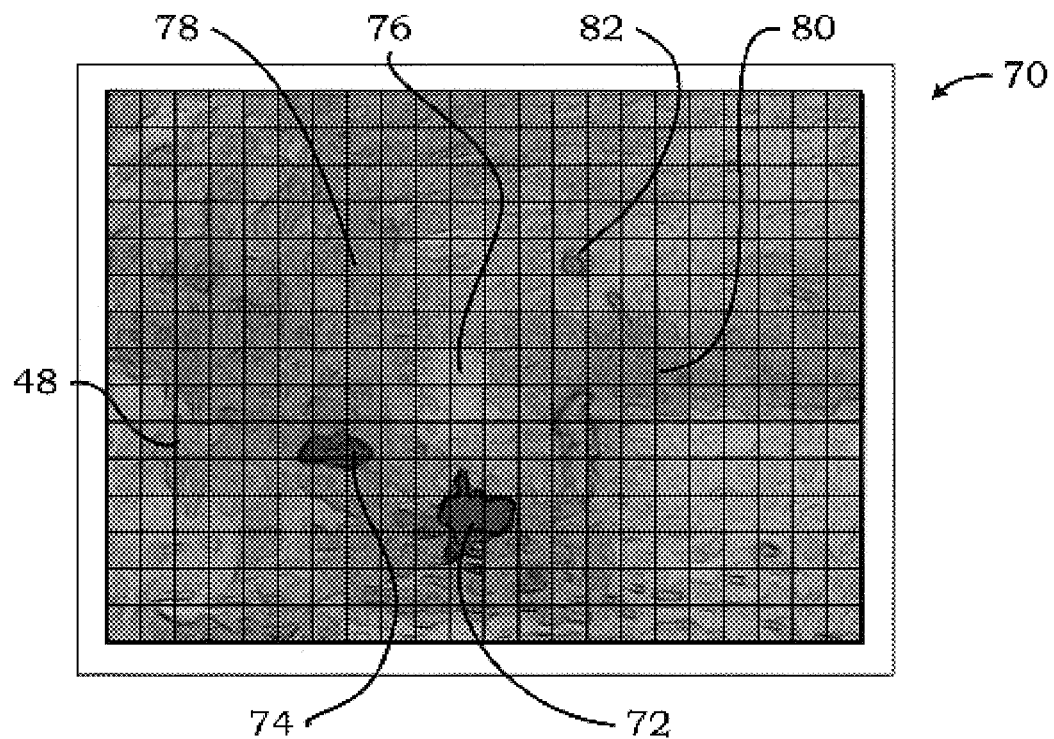
Figure 15:
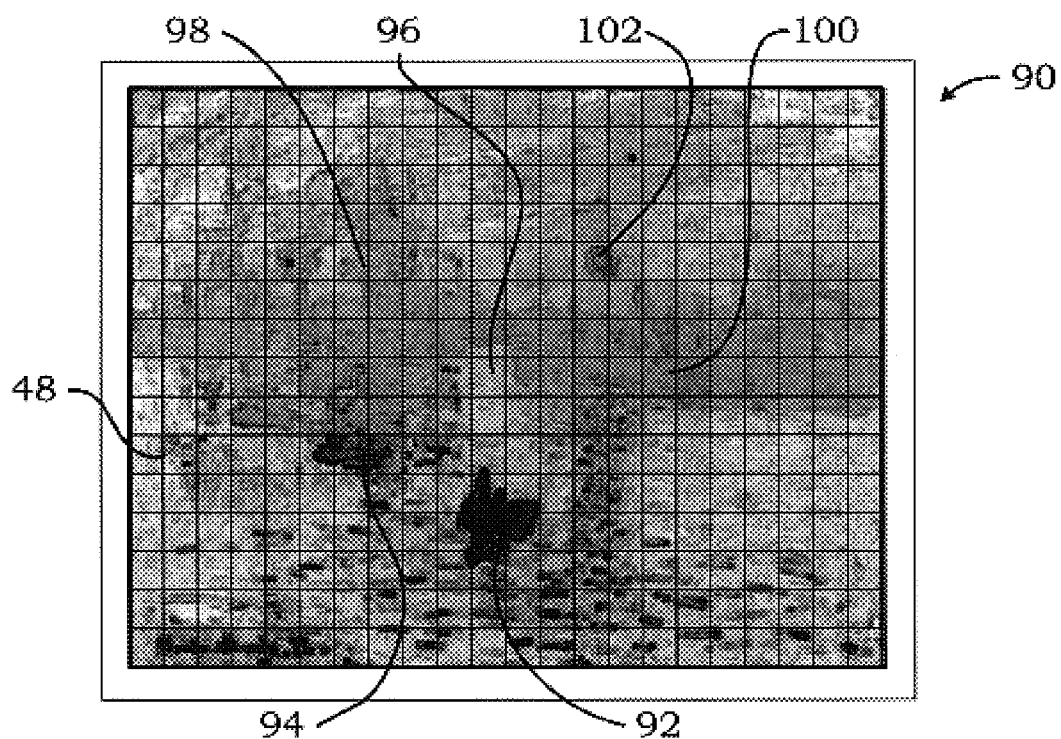
Figure 16:
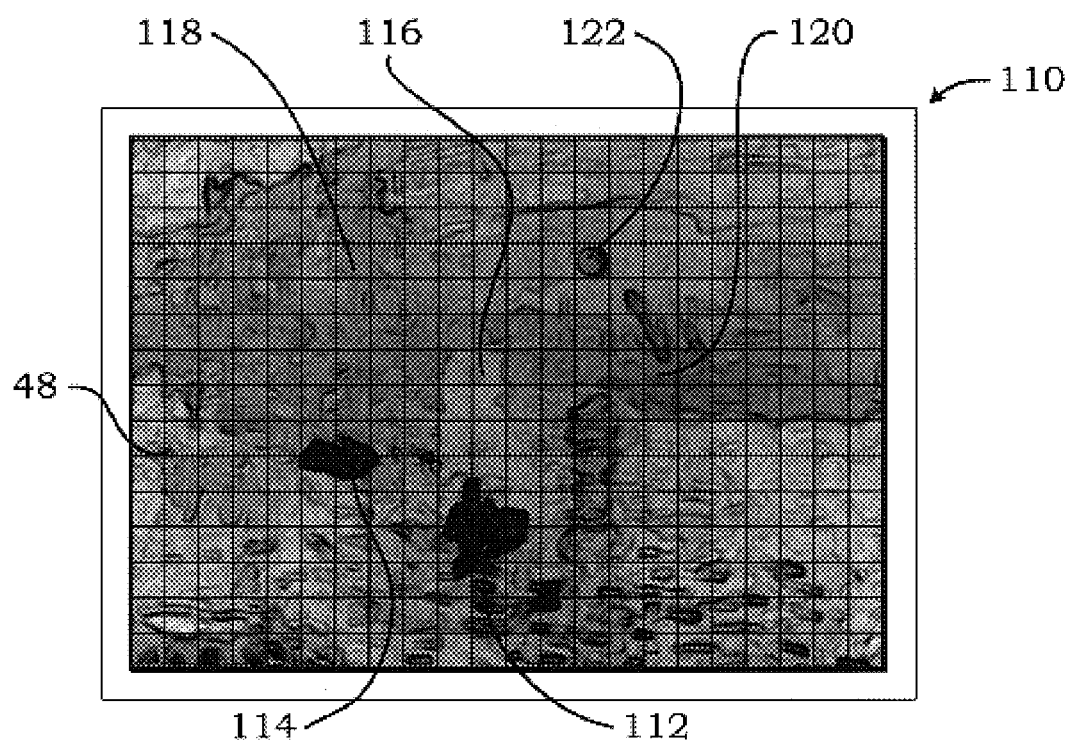
Figure 17:
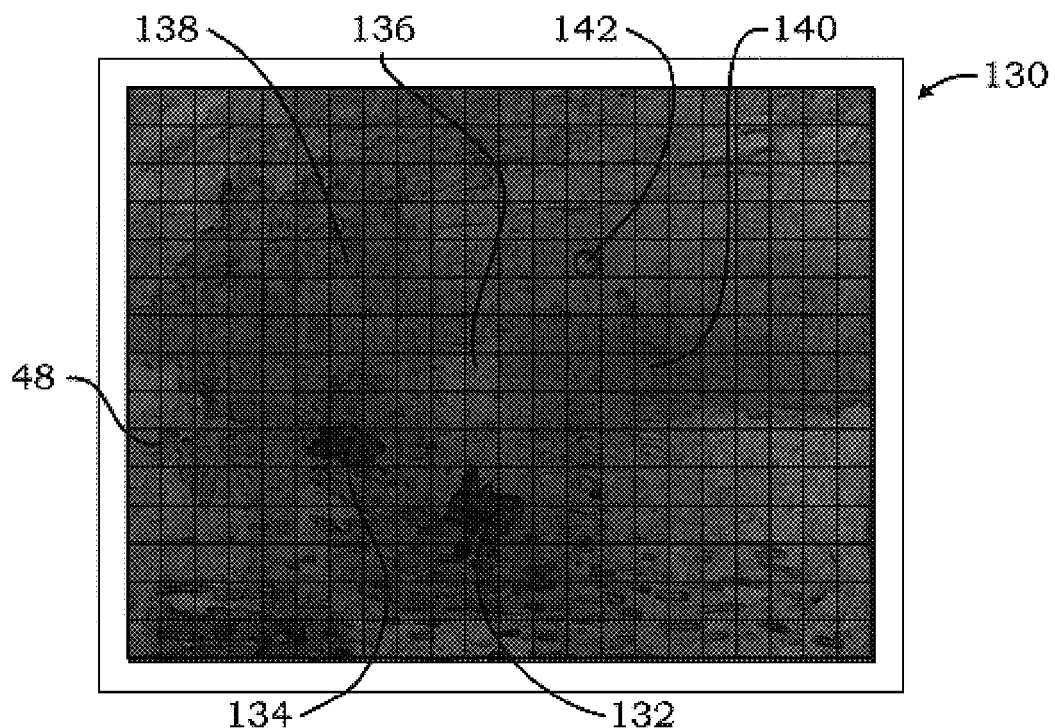
Figure 18:
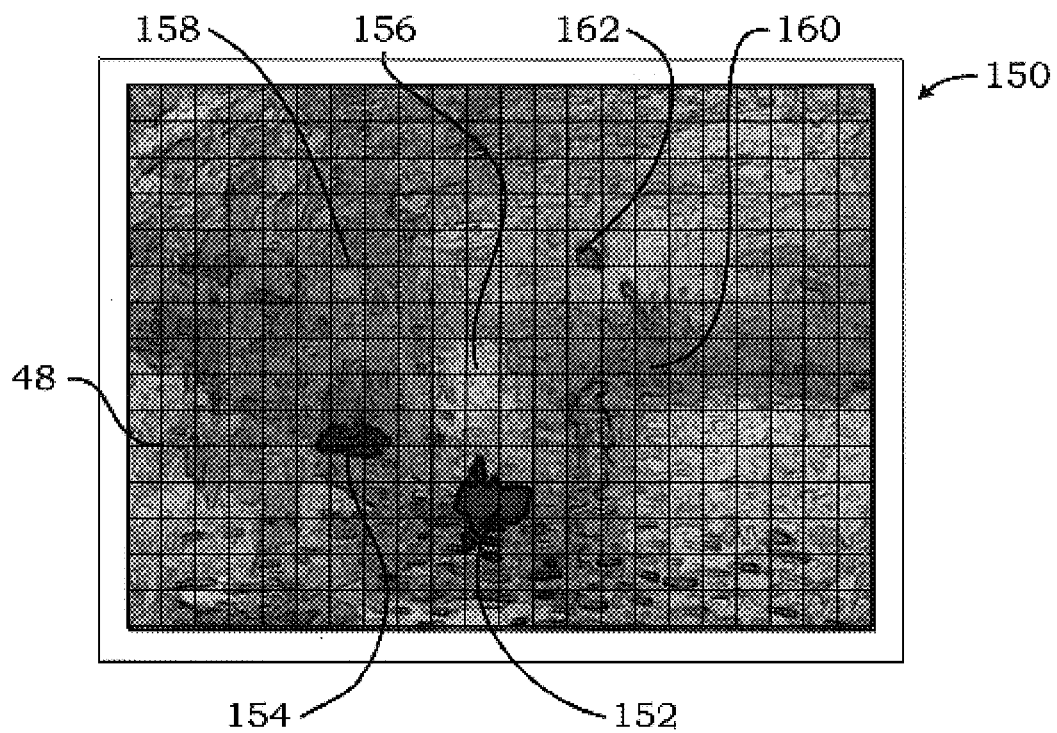
Figure 19:
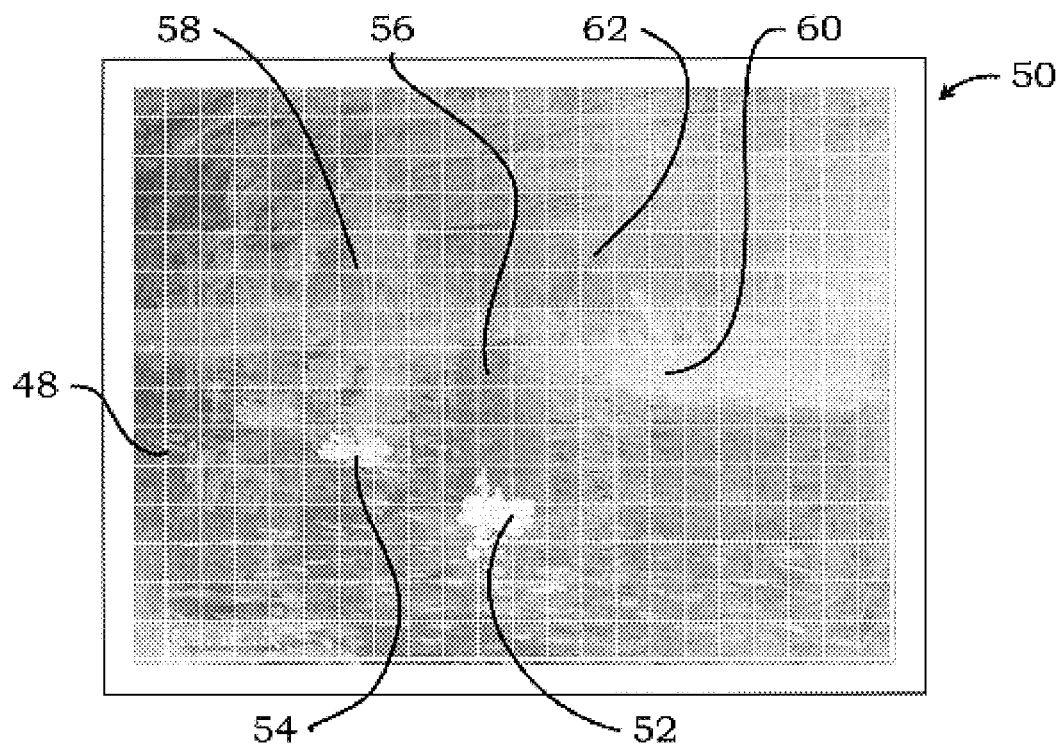
FIGS. 19-24 are negative images of the digital images of FIGS. 7-12, respectively.
Figure 20:
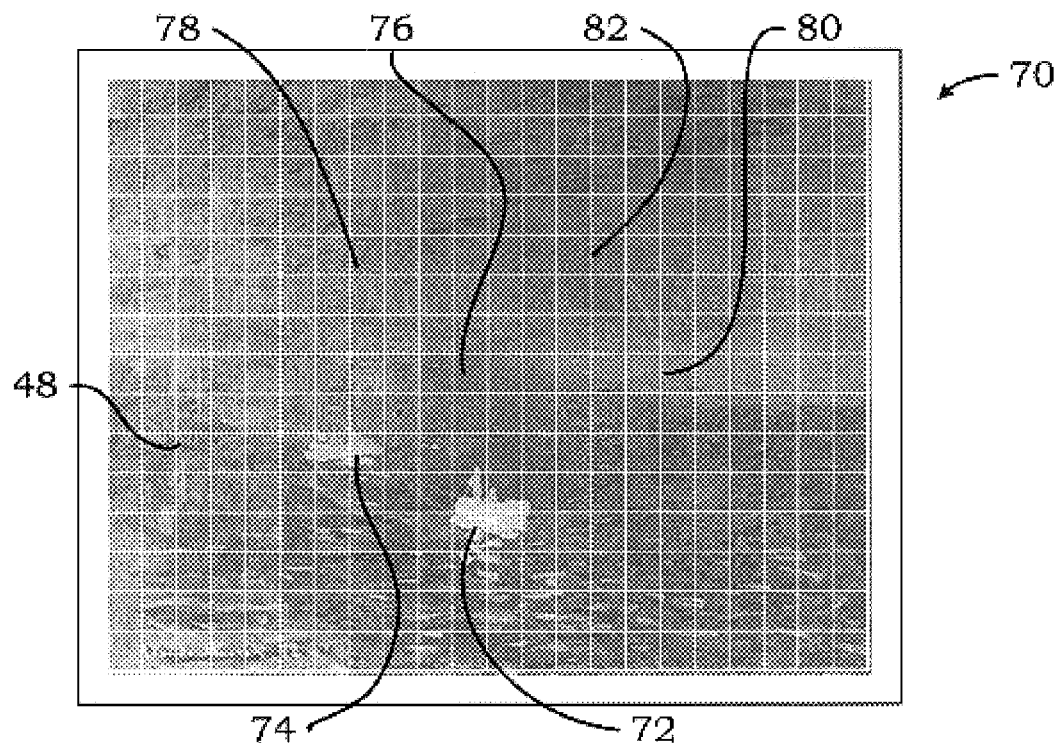
Figure 21:
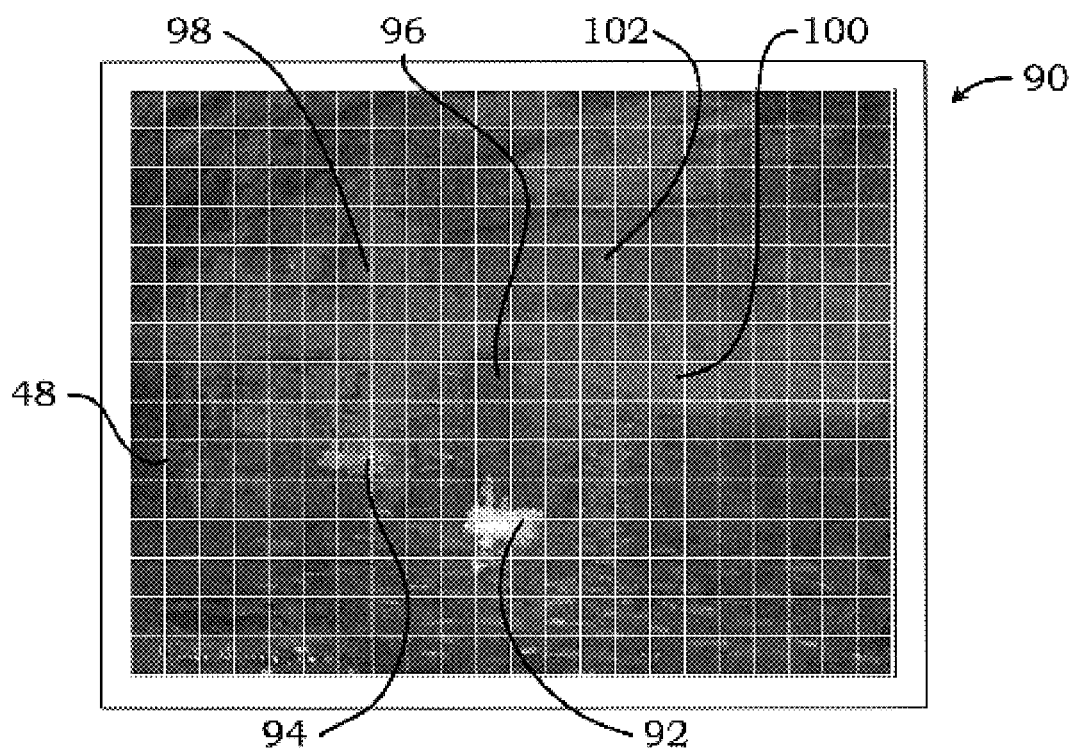
Figure 22:
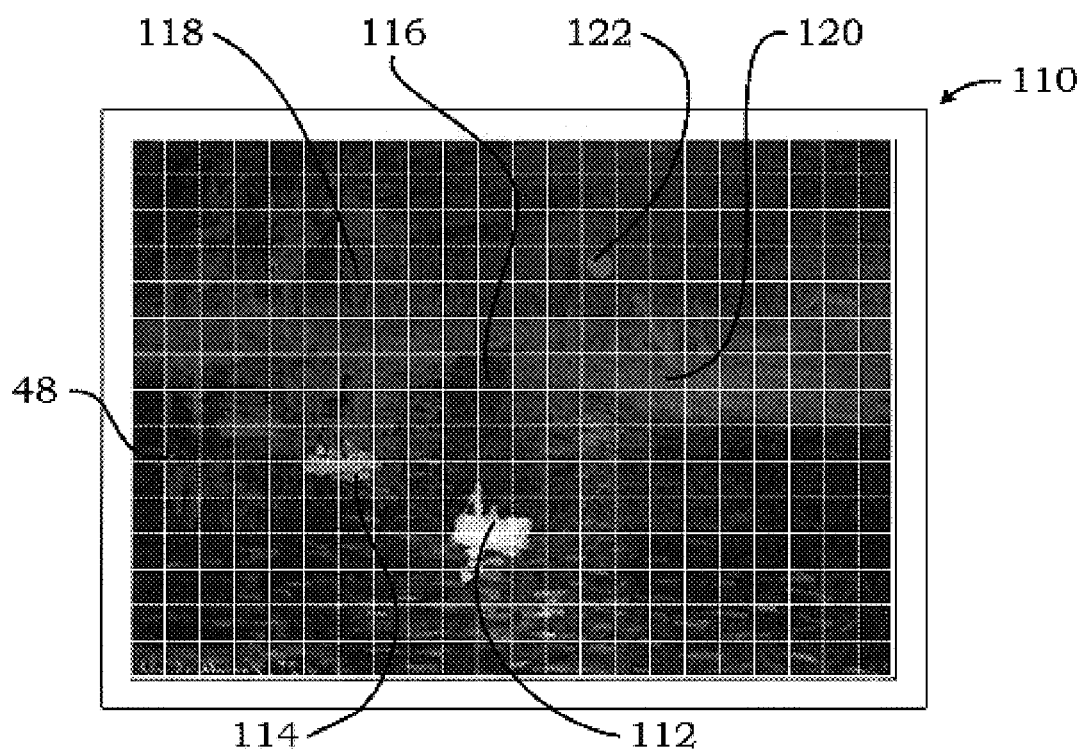
Figure 23:
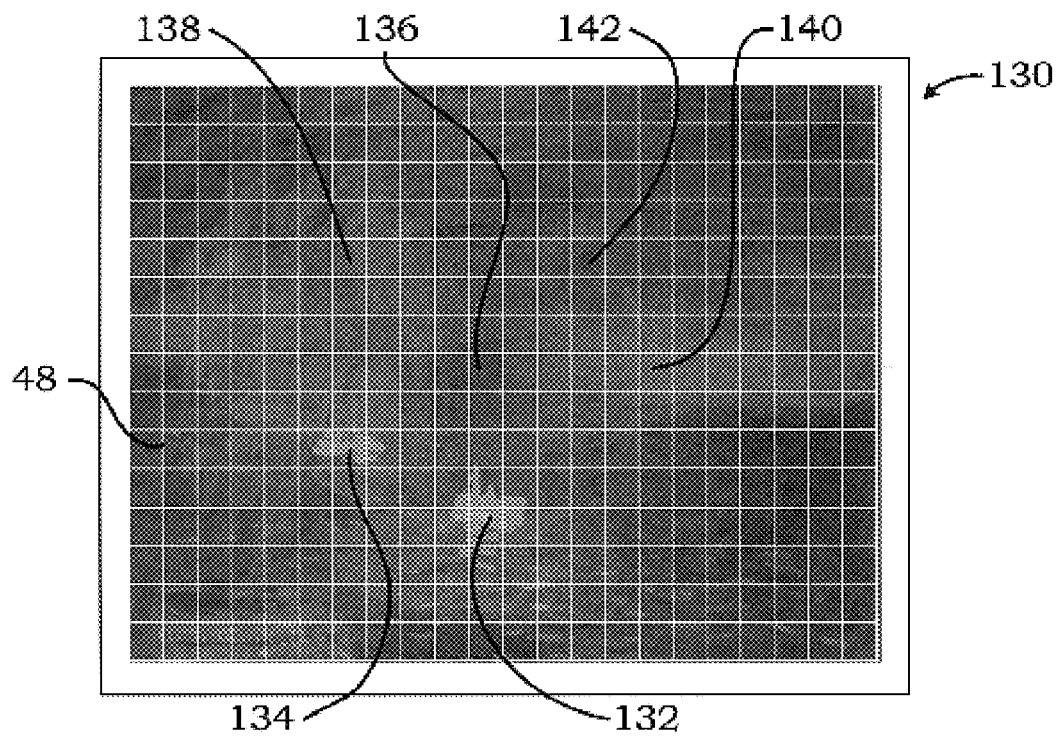
Figure 24:
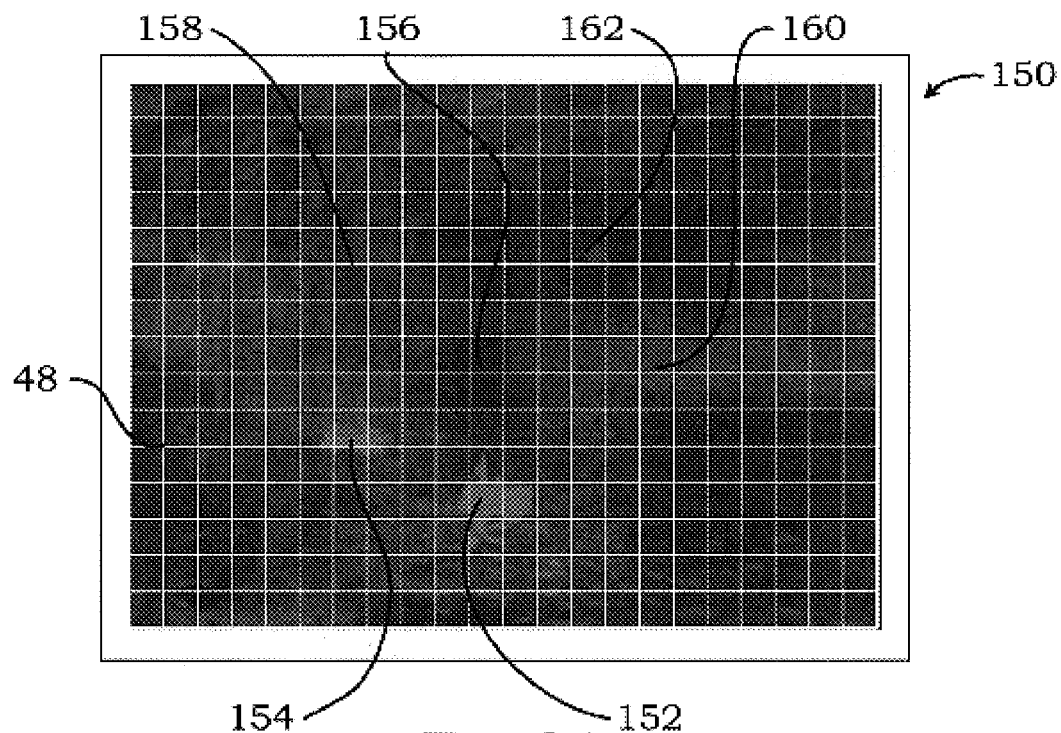

Referring to FIG. 12, the sixth Monet Sunrise painting is generally indicated by reference numeral 150. A small boat with a fisherman 152 is in the foreground of the painting 150, another boat 154 is to the left, the Thames River 156 fades into the background between smoke stacks and factories 158 and 160. The sun 162 is just above the factories 160.

Referring again to FIGS. 7-12, analysis of each of the paintings should create a similar sound or music. When an object such as the boat 52, 72, 92, 112, 132, and 152 is encountered, the analysis should create the same or similar sonels. Likewise for the other analogous elements. Subtle changes in the tone of an element such as the sun (62, 82, 102, 122, 142 and 162) should create a similar but different sound to indicate that the paintings are not the same, yet similar.

Referring to FIGS. 13-18, other features such as brush strokes may be analyzed by utilizing an edge detection algorithm which in turn may be used to determine the rhythm of the paintings.

Referring to FIGS. 19-24, the negative of the image may be used to provide additional contrast to the objects or to provide a reverse or opposite sound than would normally be expected for the visual image. The images may be analyzed in layers by applying color filters to isolate various elements or moods of the painting. The layers may then be combined to provide depth to the sound produced by the combination of the associated sonels.

Figure 25:
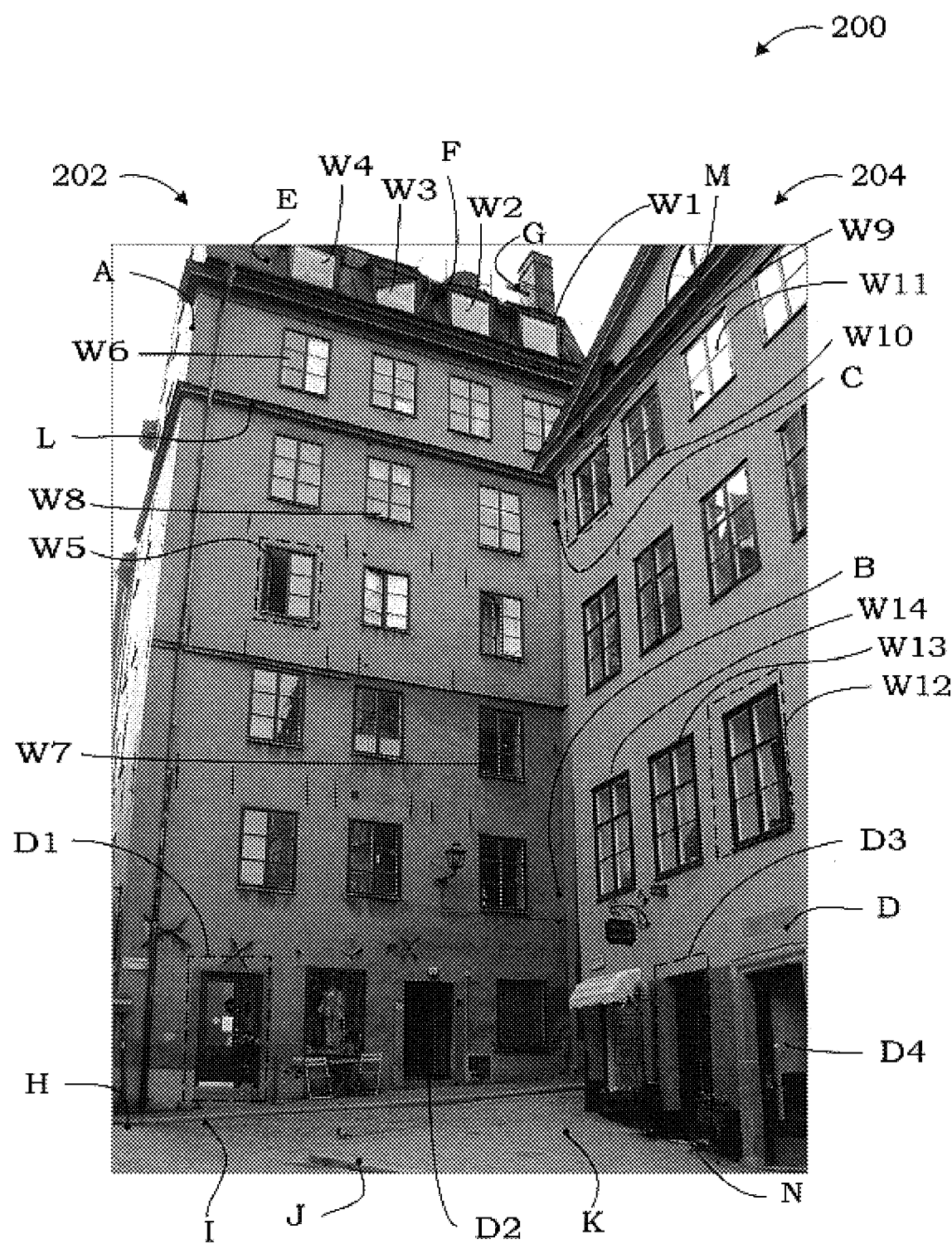
FIG. 25 is a digital image of two buildings.
Figure 26:
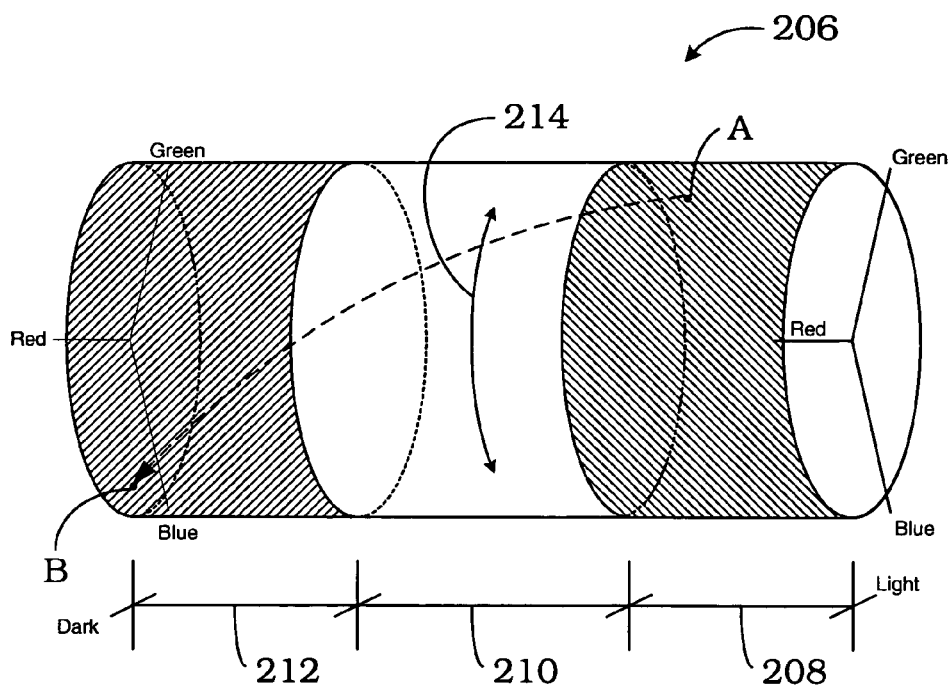
FIGS. 26-33 are illustrations of cylindrical field sonel tables derived from analysis of the digital image of FIG. 25.

Referring to FIG. 25, a photograph 200 of two buildings 202 and 204 is shown in black and white. The overall image is of two old multi-storey European buildings in Stockholm, Sweden. In the original photograph, the building on the left 202 is pink and the building on the right 204 is butter yellow. The sky is very pale above and the street is a light gray. The user may decide, from among the program's sound samples, on a pastoral, orchestral accompaniment for large color areas, punctuated by captured conversation sound samples set for the different window types. In scanning from left to right, the bright side of the pink building 202, a field sonel is created which is assigned to a bright sample. To illustrate the components of a field sonel, a cylindrical table 206 of the sonelization is shown in FIG. 26. The field sonel table 206 for the pink building 202 may be determined by selecting point A on the bright side of the pink building 202 as a starting point. Point A is very light pink and point B is a darker, rosier pink. Where the color deepens at point B, the tone of the sample becomes more somber. Cylinder 206 is divided into red, blue and green to place the point scanned.

When scanning from point A to point B, the tone changes from a happy tone in the range illustrated by the continuum 208, to a mixture of happy to somber 210, to a somber tone 212, as the sample ranges from light to dark. The frequency 214 of the sample varies from a higher frequency toward the top side of the cylinder 206 to a lower frequency. Additionally, the volume 216 of the sample may be set by the user to vary over a small range.

Figure 27:
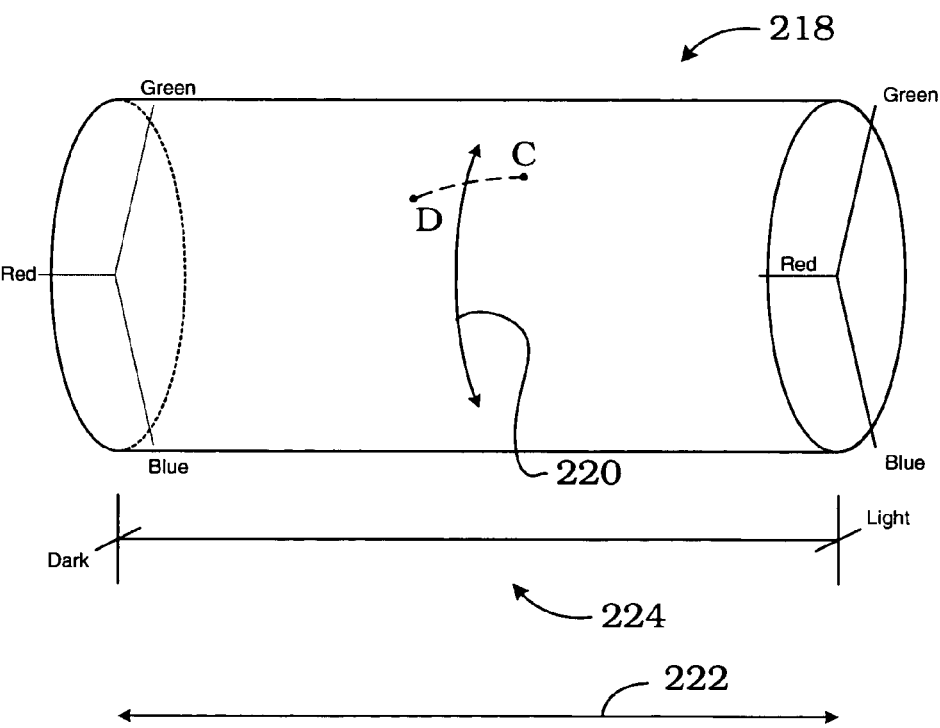

Referring to FIGS. 25 and 27, the field sonel table for the butter yellow building 204 is illustrated as cylinder 218. Scanning from point C to point D, the color and brightness varies only slightly. Thus the frequency 220 and volume 222 will change very little for this sound sample 224. It should be understood that the use of a cylinder is for illustrative purposes only. Other illustrations may be used to illustrate and describe this analysis.

Figure 28:
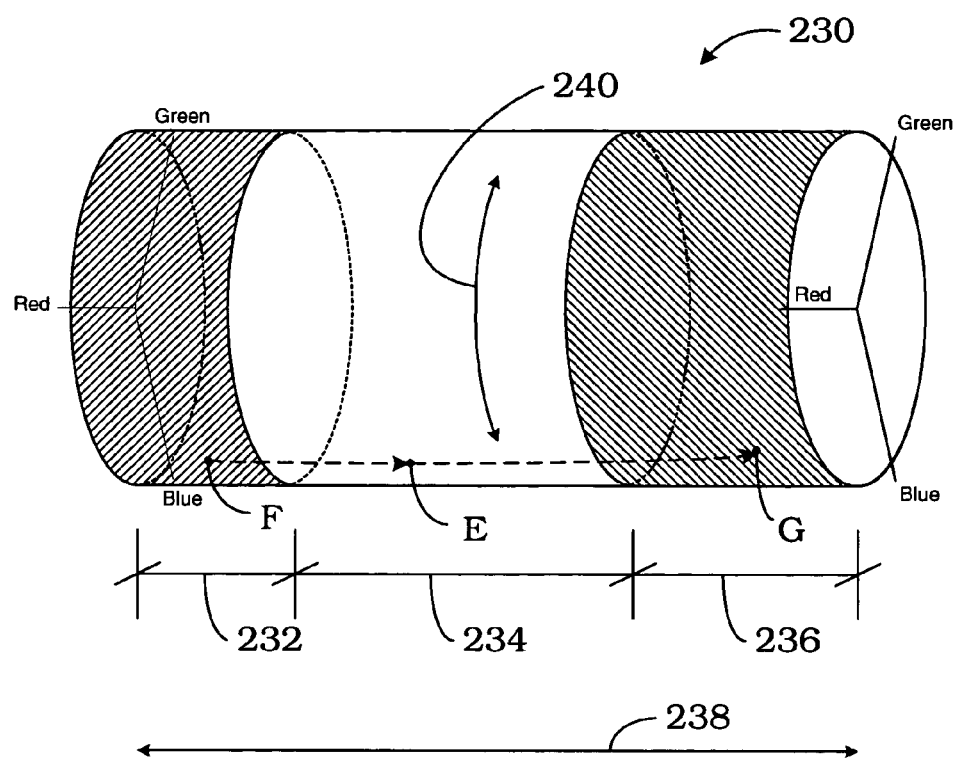

Referring to FIGS. 25 and 28, the gray roof of the pink building 202 may be correlated to an orchestral sound sample of woodwinds, for example. The sonelization table for the grays in the roof may be illustrated as cylinder 230. Scanning across the roof from point F to point E to point G, the woodwinds may vary from a clarinet range 232, to an oboe range 234, to a flute range 236. Moving from the relatively dark area at point F, the volume 238 may increase to the lighter area of point G. The frequency 240 will change very little for this sound sample.

Figure 29:
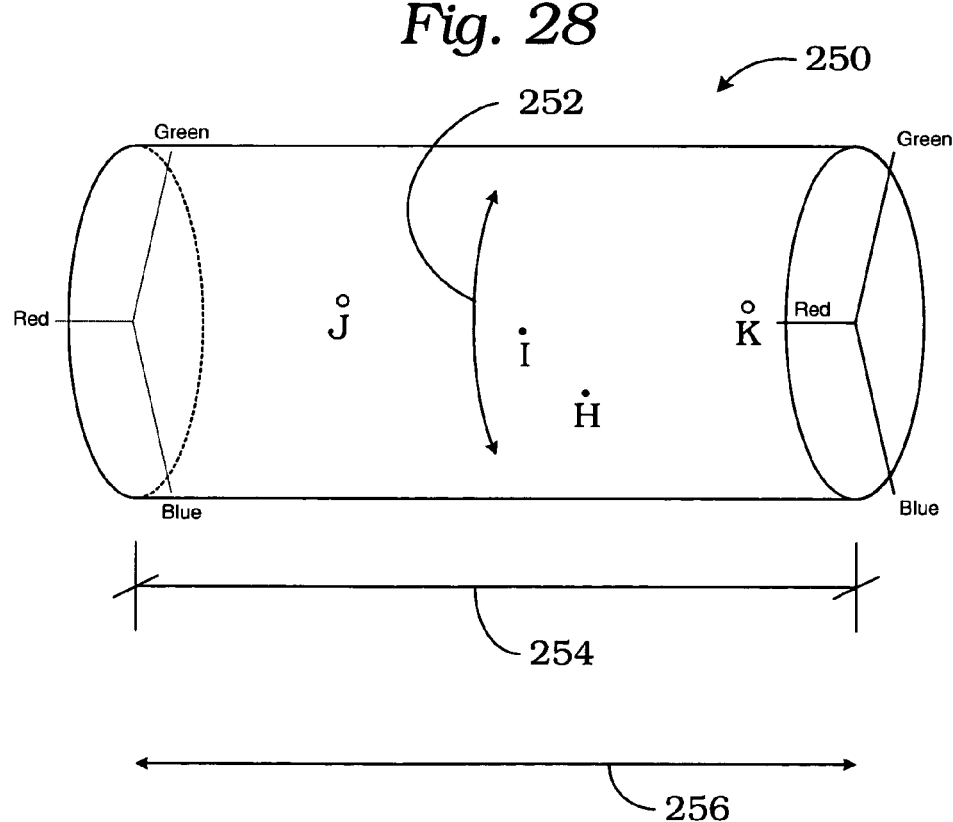

Referring to FIGS. 25 and 29, the sonelization table, illustrated as cylinder 250, for the gray pavement of the street in front of the buildings may be correlated to a repeating loop of lower range woodwind instruments. As the pavement is scanned at points H, I, J and K, the color value for each sonel would change the frequency 252 for the woodwind sound samples 254 with a slight volume variation 256. As shown in FIG. 29, points J and K lie on the back side of the cylinder 250.

Figure 30:
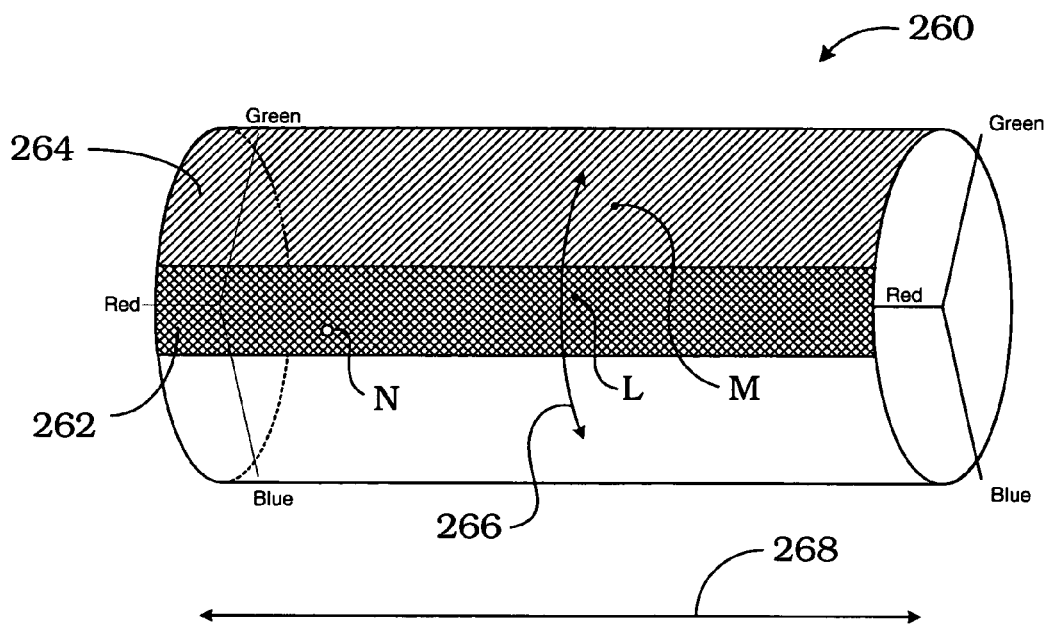

Referring to FIGS. 25 and 30, the sonelization table, illustrated as cylinder 260, for the trim and shadows of the buildings may be correlated to sound samples of stringed instruments. As the whole image 200 is scanned, a track may be defined of stringed instruments such as a violin 262 and a viola 264 from the sonels of the trim and shadows of the buildings 202 and 204. From the points M, N and L, the frequency 266 is varied along with the volume 268.

Figure 31:
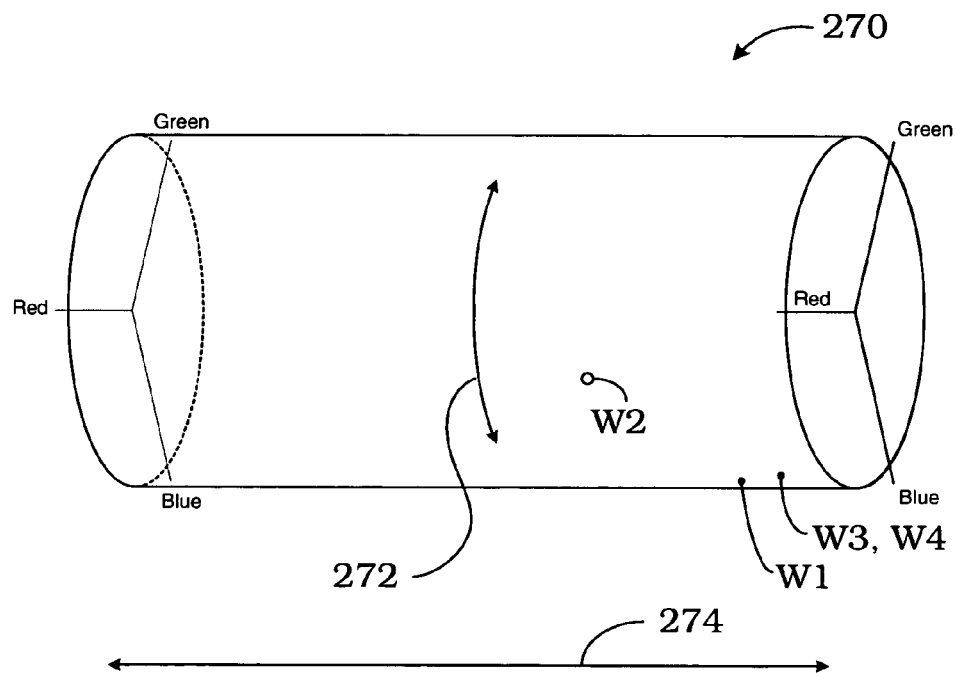

Referring to FIGS. 25 and 31, object sonel types may be defined, illustrated as cylinder 270, for the upper windows and correlated to sound samples of quiet conversation, for example. The user defines a top window W1 as a shape and assigns a sound sample to it. As the image 200 is scanned, similar shapes such as W2, W3 and W4 are identified and designated as that type of object sonel and assigned the corresponding sound sample. The frequency 272 and volume 274 for the average sonel value are assigned for the specific object. As shown in FIG. 31, point W2 lies on the back side of cylinder 270.

Figure 32:
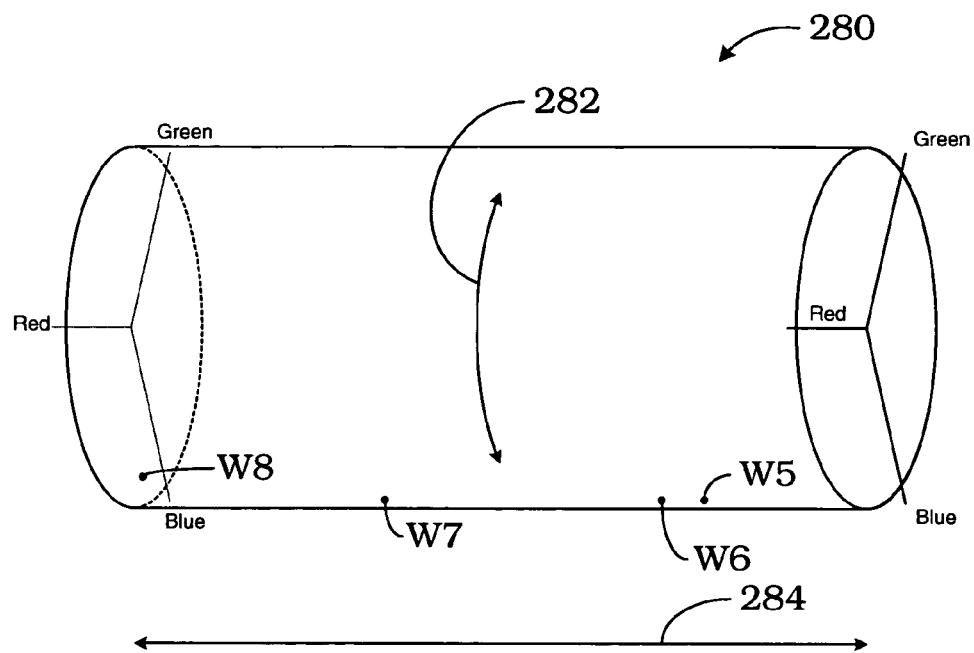

Referring to FIGS. 25 and 32, a second object sonel type may be defined, illustrated on cylinder 280, for the other windows on the pink building 202 and correlated to sound samples of family conversation, for example. The user defines a window W5 as a shape and assigns the family conversation sound sample to it. As the image 200 is scanned, the windows W6, W7 and W8, for example, are identified and designated as an object sonel type 2. The frequency 282 and volume 284 for the average sonel value for a specific object are assigned. An open window, for example, will darken the average value for the object sonel.

Figure 33:
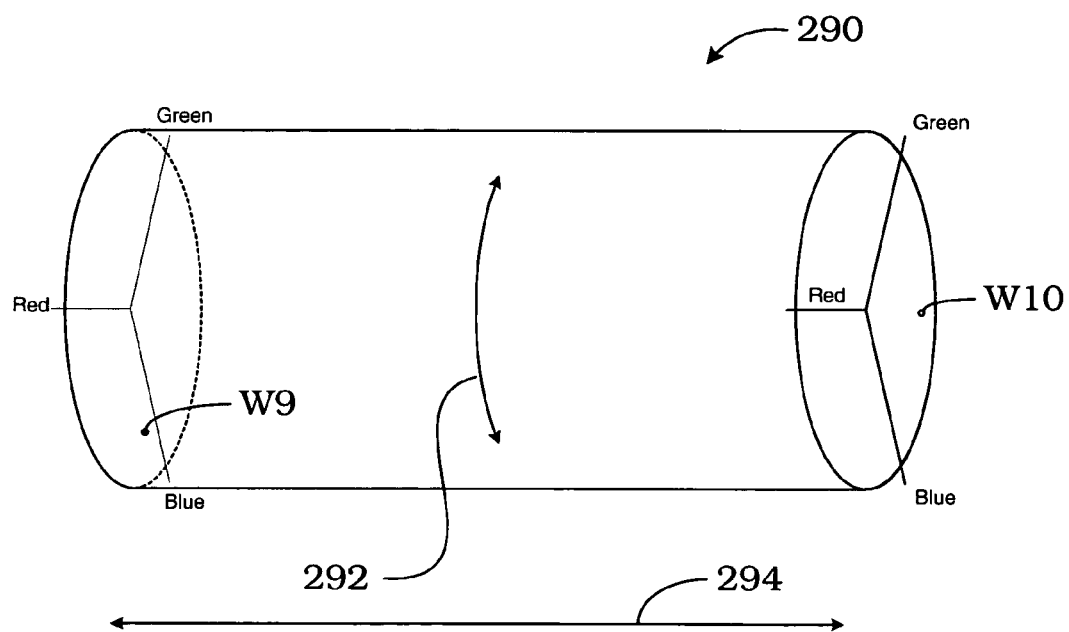

Referring to FIGS. 25 and 33, third and fourth object sonel types may be defined, illustrated on cylinder 290, for the windows on the yellow building 204 and correlated to sound samples of a family with children, for example. The user defines a window W9 as a shape and assigns the family with children sound sample to it. As the image 200 is scanned, the windows W10 and W11 are identified and designated as an object sonel type 3. The windows W9 and W10 in the shadow of building 202 will darken the average value for those object sonels. The user defines a window W12 as a shape and assigns the family with children sound sample to it. As the image 200 is scanned, the windows W13 and W14, for example, are identified and designated as an object sonel type 4. The frequency 292 and volume 294 for the average sonel value for a specific object are assigned.

Referring to FIG. 25 a fifth object sonel type may be defined for the door on the pink building 202 and correlated to sound samples of conversation with background noise in a retail business, for example. The user defines the door D1 as a shape and assigns the sound sample to it. As the image is scanned, one or more other doors (D2) may be identified and designated as an object sonel type 5. Similarly, a sixth object sonel type may be defined of the door on the yellow building 204 and correlated to sound samples of café chatter and noise. The user defines the door D3 as a shape and assigns the sound sample to it. As the image is scanned, one or more other doors (D4) may be identified and designated as an object sonel type 6.

Sonels may also be ordered by color or grayscale values for an entire image or sub-areas of an image using histograms, for example.

Figure 34:
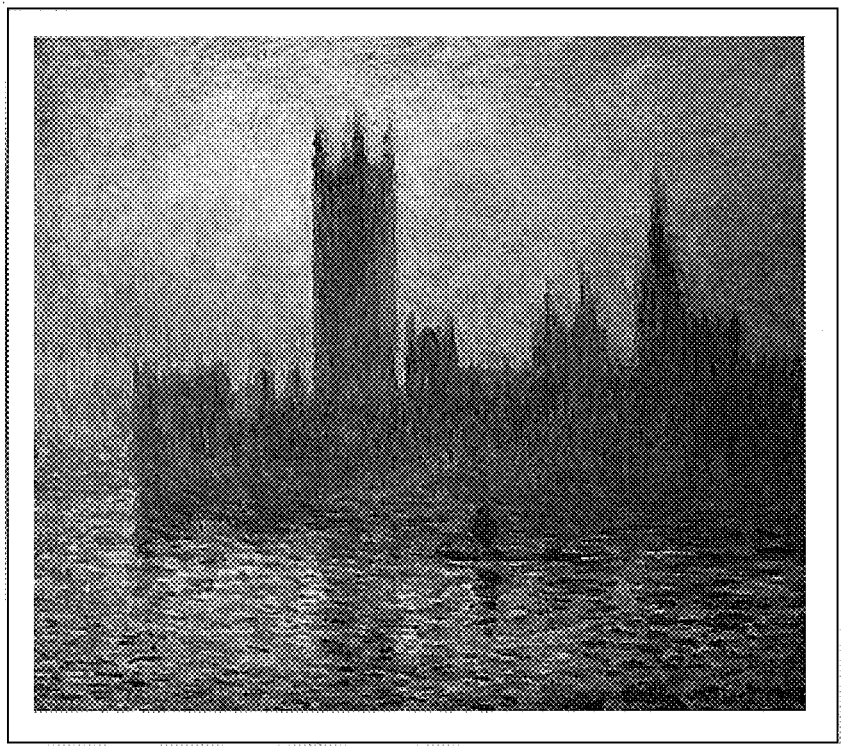
FIGS. 34-37 are digital images of four different Monet paintings.
Figure 35:
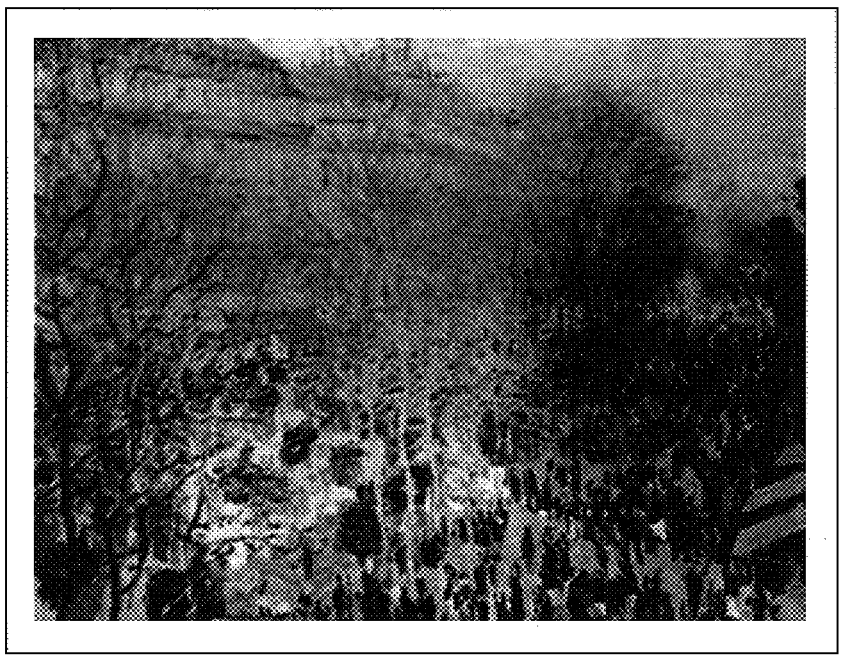
Figure 36:
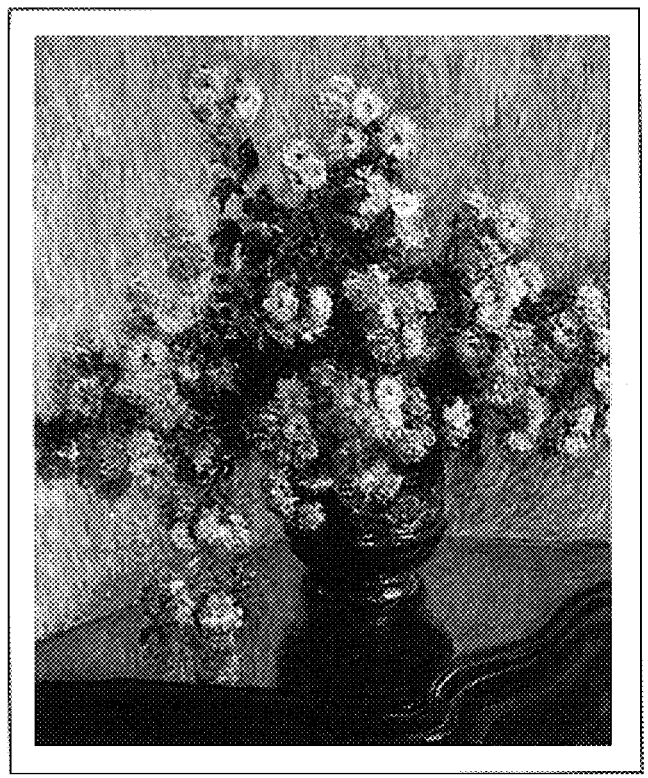
Figure 37:
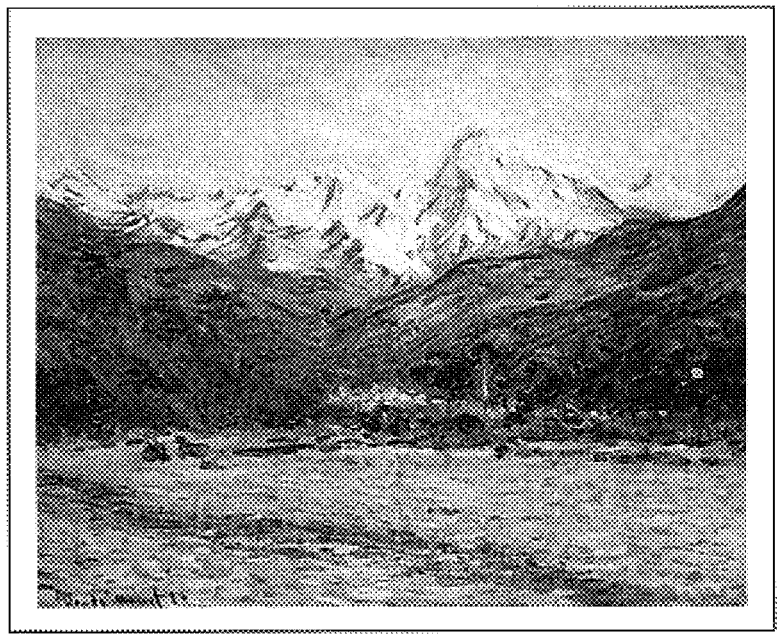
Figure 38:
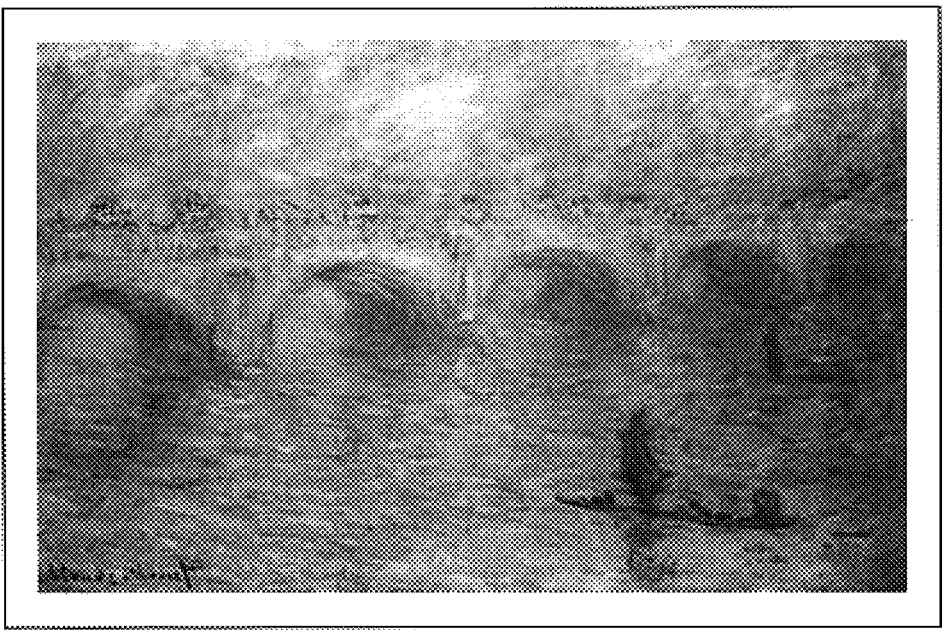
FIGS. 38-41 are digital images of four of Monet's Waterloo Bridge paintings.

Four Monet paintings such as Houses of Parliament (FIG. 34), Boulevard des Capucines (FIG. 35), Flowers (FIG. 36) and Valley of Nervia (FIG. 37), for example, may all sound as though the same composer wrote them because the sonel values, brushstrokes rhythm would be similar, but would sound like distinctly different songs because the shapes, composition, colors are distinctly different.

For this example, the user begins with four Monet paintings of different subject matter. The software may be set by the user to scan each image in the same way so that it will produce the same sound when similar sonels are found in each painting. This will provide a soundtrack for all four or the images that will sound similar in the same way that music written by the same composer can.

Generally, in Monet's work (or any artist's work) there will be common ways of handling color, composition, brushwork, or subject matter, for example. What is similar in these works are the mark making caused by the small linear brush strokes placed side by side, a relative low contrast between the lightest and darkest colors, soft edges of the objects, a sense of atmospheric perspective, and a main subject with a definite foreground, middle ground and background. What differs in these four paintings are the subject matter and its effect on the composition, and color.

When first seen, Monet's works were accused of looking like confetti. This metaphor may be the basis for the soundtracks. In the Houses of Parliament painting, FIG. 34, three brushstroke areas may be selected and defined as typical; the horizontal larger strokes in the water toward the lower edge, the smaller, vertical strokes in the middle band of the parliament building, and the small, subtle strokes in the sky. To enforce the metaphor further, the user selects sound samples from activities that are associated with confetti, such as parades, parties, or political conventions. Setting the following sound samples to each brushstroke type, large horizontal strokes as loud parade noise, medium vertical strokes as party music and small strokes as party conversation. The images can be further analyzed to produce field sonels based on color and assigned associated "confetti" sounds, and field sonels that contain the selected brushstroke types with the assigned sound samples. In this manner, further layers of sound may be added.

When scanning the images from upper left to lower right, the House of Parliament (FIG. 34) and the Boulevard des Capucines (FIG. 35) would sound similar from the point of color but the House of Parliament (FIG. 34) would be "smoother" in its transition between sounds because of the graduation of small brush strokes to large horizontal brush strokes. The Boulevard des Capucines (FIG. 35) painting would be smoother at the top having patches of medium brushstrokes along with additional sounds from the fields of color. The House of Parliament (FIG. 34) and Valley of Nervia (FIG. 37) paintings have similarities in upper small brushstrokes and lower horizontal strokes but their different middle horizontal bands and overall image colors would provide the main soundtrack differences in this case. The Flowers (FIG. 36) painting would sound the least like the other three because of its violet color and it consists of mostly medium sized vertical strokes in the upper three quarter of the painting and finishes at the bottom with small subtle strokes. The flowers are of a different brushstroke than those found in the first painting and would have to be further defined on their own or given a field sonel value.

Artistic movements such as the French Impressionists of the late 19th Century may all sound related when compared to Italian Renaissance painters, in the same way that music from a certain time period sounds related when compared to a style from another time.

Figure 39:
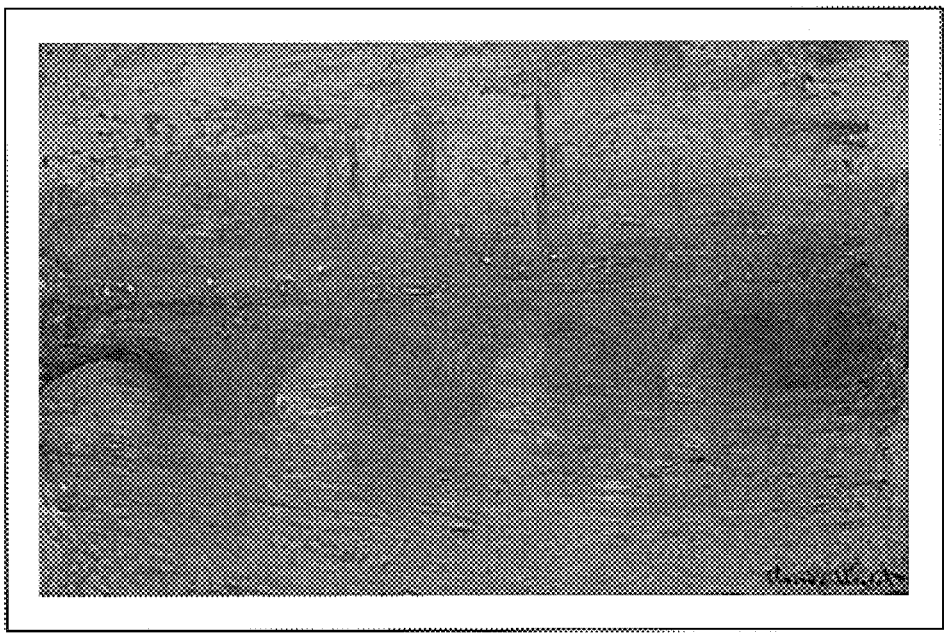
Figure 40:
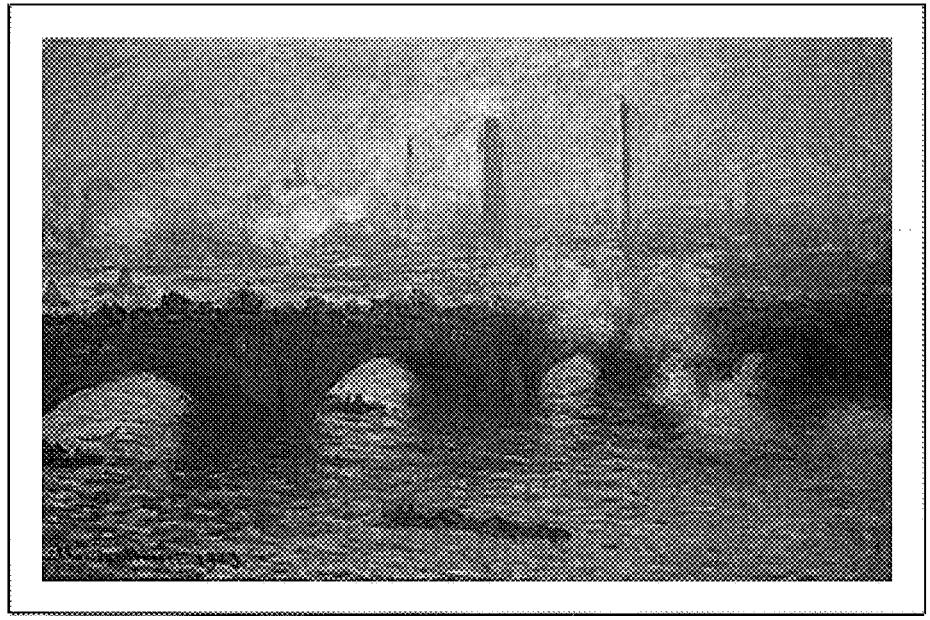
Figure 41:
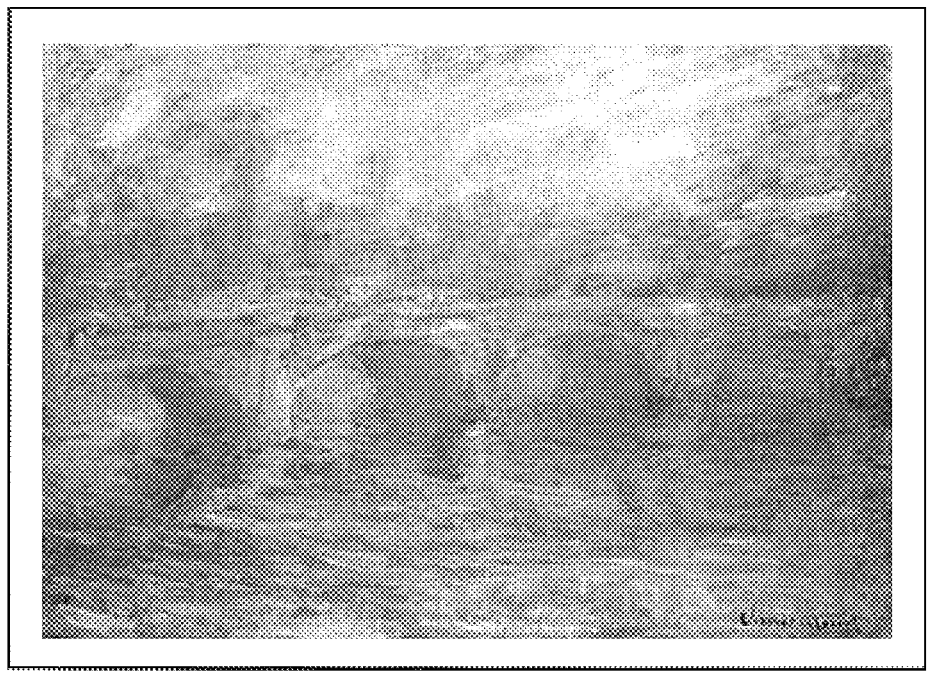

Referring to FIGS. 38-41, four of Monet's paintings of Waterloo Bridge, which have been painted from approximately the same location, may be analyzed. They have similar perspectives, same main subject matter, and similar horizon components, for example. The user may choose to assign an instrumental sound sample to the dominant color of the painting. By selecting several points and assigning the whole painting as a field, the software assigns an average field value for the whole painting. The paintings of FIGS. 38 and 40 have orange colors, the painting of FIG. 39 is aqua and the painting of FIG. 41 is violet. Variance in the range of colors across a painting provides the "tuning" of that painting's soundtrack.

Scans of all four paintings would find similarities in overall shapes created by the arches of the bridge. This object sonel would be assigned a sound sample that would be common to all four soundtracks.

The grayscale scans of the paintings provide the rhythm from the brushstrokes. The grayscale value indicates the emphasis of the beat. The rhythmic changes are more pronounced in the paintings of FIGS. 38 and 40. The painting of FIG. 39 is a very quiet painting and the painting of FIG. 41 is in between, for example.

Referring to FIGS. 42-45, portraits from four different periods spanning 500 years of Western art history are shown. It's taught in art history classes that older paintings look old because of their less saturated colors, the use of atmospheric perspective (i.e., colors fade off in the distance) and the amount of detail provided in the backgrounds. Using these points as the main premise, the user may set the software to analyze the images for color and brushstrokes within the fields of color. Sound samples are assigned to both the levels of saturation in the paintings and the markmaking differences within the individual fields of color. The resulting soundtracks may provide analogies in sound that correspond to the historical changes. One approach may be to have four sets of soundtracks. For example, for each soundtrack set, the user may pick instrumental sound samples from the same time period as one of the works of art. Soundtrack set one may be all four paintings analyzed with Italian Renaissance sound samples and so forth with the others. Soundtrack 2 may be late 1800s Paris café music, soundtrack 3 may be early $20^{th}$ century jazz, and soundtrack 4 may be contemporary hip-hop. This provides the viewer/listener with more of a feel of the visualization of the arts at the time of each music period, and may show interesting and unexpected patterns that show why one type of music just wouldn't work in certain visual situations, or works surprisingly well. This provides a cross sensory method of analyzing historical periods.

Figure 42:
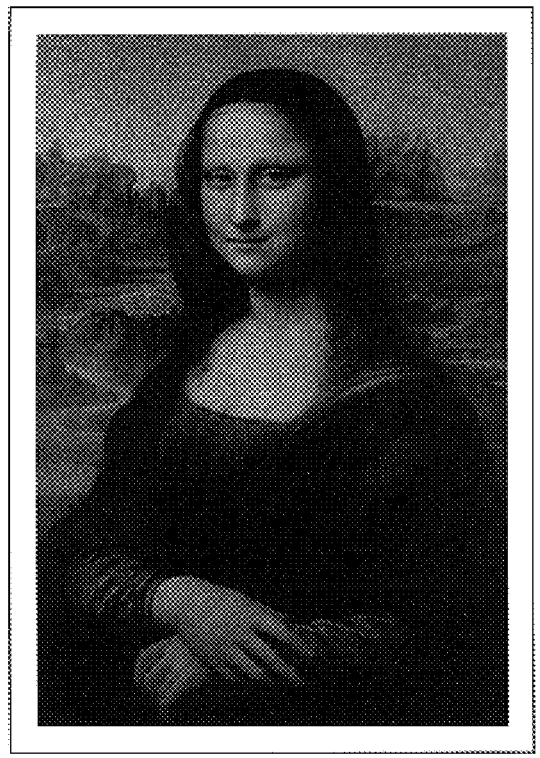
FIGS. 42-45 are digital images of portraits from four different time periods.

All four paintings are similar in their basic composition. The person(s) in the portrait is centered in the painting and has a background behind them. Referring to FIG. 42, in the painting from the Italian Renaissance by daVinci, the colors are muted and drab, they fade into the distance but detail in the receding landscape is still present. Brush strokes are used to produce the detail and are not by themselves seen as mark making, detail is seen in the fabric and hair of the subject. Large fields of color are painted smoothly.

Figure 43:

Referring to FIG. 43, in the painting by Mary Cassatt, an American impressionist painter living in France during the late 19$^{th}$ century, all of the colors are more intense and pure, less detail is seen in the background and the brushwork provides less detail in the hair and fabric. These areas become more fields of color and the brushwork may not correspond to specific details. In addition, there is a tightening in of the composition with less background shown.

Figure 44:
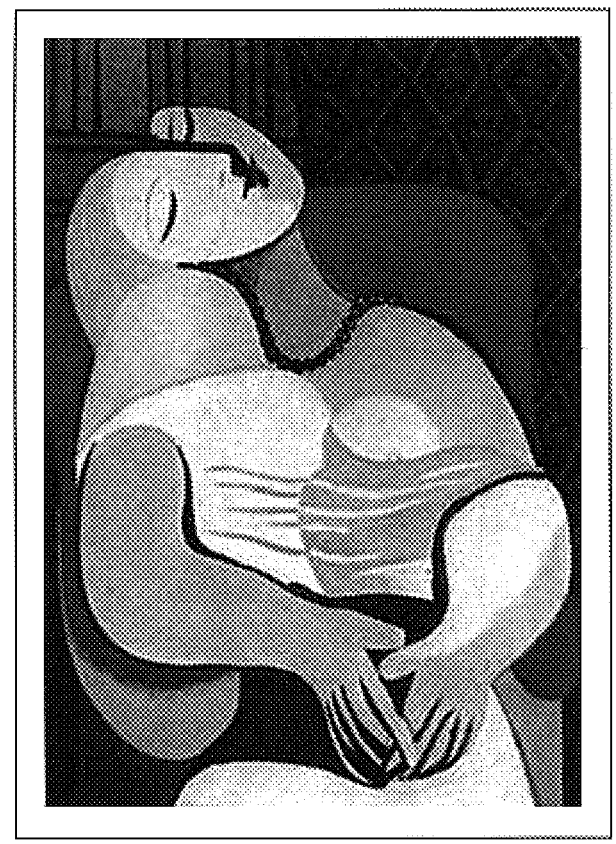

Referring to FIG. 44, in the painting by Picasso from the early 20$^{th}$ century, one sees some of the ideas which following him became more common in modern painting. There are large flat areas of intense color, details further reduced and brushstrokes disappear into the flatness. The subject is zoomed in even further, filling more of the image, and producing less fields of color to analyze.

Figure 45:
Figure 46:
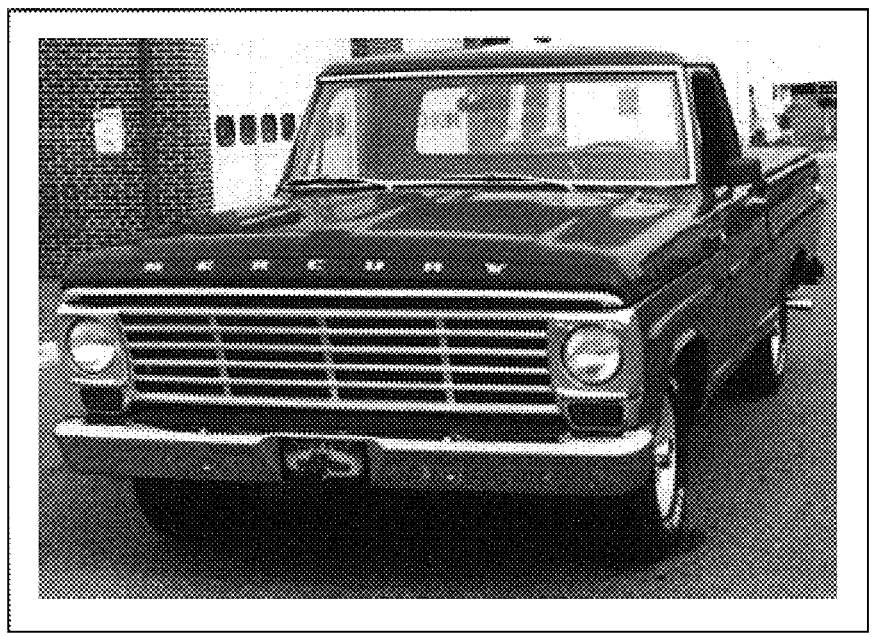
FIGS. 46-49 are digital images of everyday objects.
Figure 47:
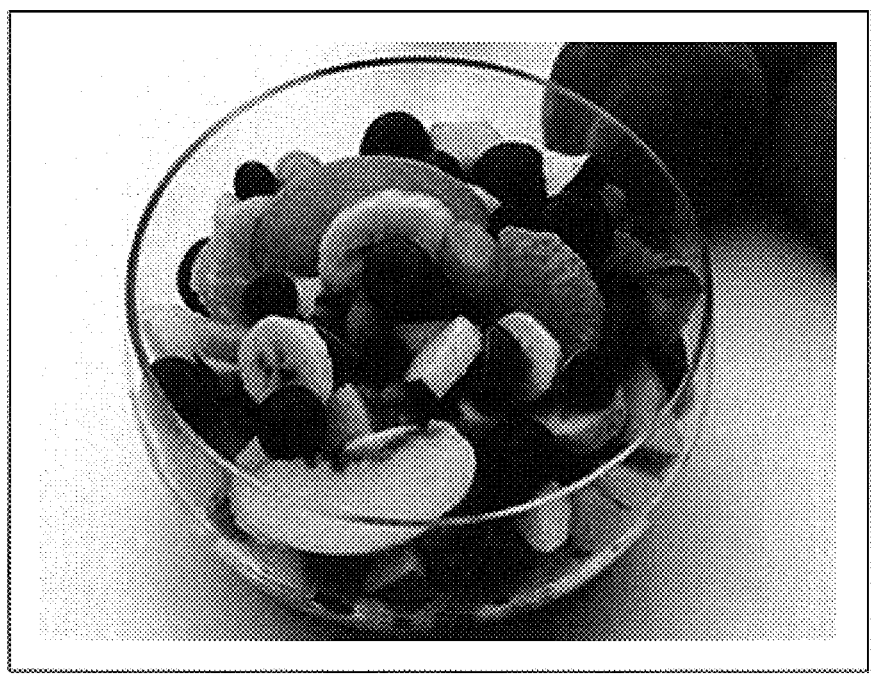
Figure 48:
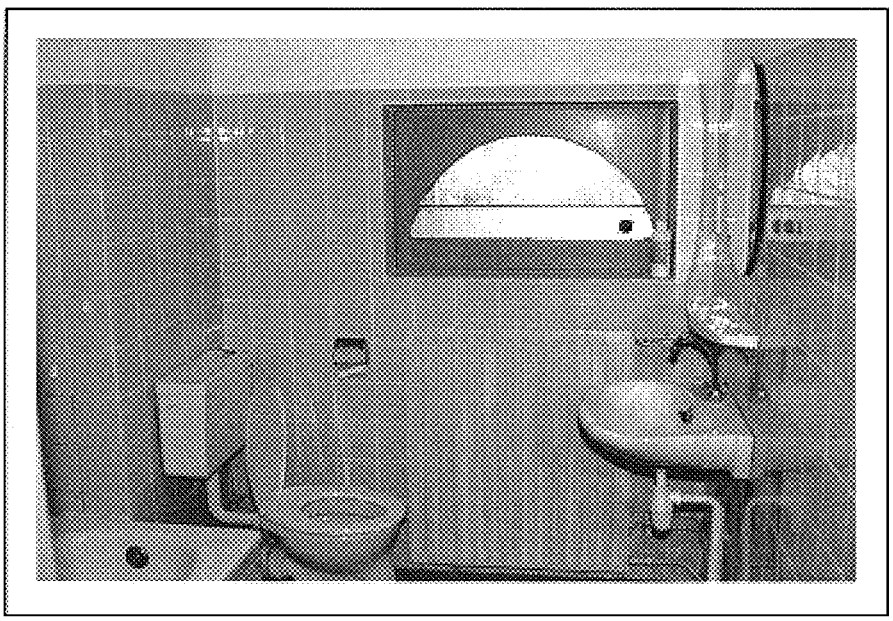

Referring to FIG. 45, the painting by Alex Katz, an American, is from the present. It shows extreme tightening of the composition. It is reduced to even fewer color fields, so that the face, background, shirt etc. are just one color. However, some detail returns and is used as emphasis in the hair and facial features.

One interpretation could be as follows: setting the color and brightness to produce the tone/key of the artwork and setting the rhythm based on the amount of detail within the color fields. Because the color fields that would be sonelized would become proportionately larger from the earliest artwork to the latest, the soundtracks would go from being quite complex but with tonally limited range such as daVinci's painting FIG. 42, through less complex but with more tonal range in Picasso's FIG. 44. Interestingly though, the Katz painting FIG. 45 would be less complex and have less tonal range. Cassatt's painting FIG. 43 would be the most complex because it has the most variation within the color fields across a larger tonal range.

Five images of beach sunsets would sound similar because they are based on the composition of sun shape, cloud shapes and horizon, but would differ based on intensity of value and colors.

By way of another example, a user may define intra-image shapes which are then sonelized. Different shaped and colored objects may produce different sounds. The user may define a repeating object in an image as a set of pixels and that set of pixels is sonelized and assigned a sound. The same or similar object pixel sets within the image are then given the same or similar sound. An image of an apple tree laden with apples would produce the same sound whenever the scan reached the pixel sets defined by selecting the apple shape, for example. Different color apples would have a similar sound.

The user may set up parameters for sounds, run the program in a random scan or without user input to analyze a painting or other image and produce the corresponding sound track. The user may define some areas or objects as similar in advance which are then used to analyze the differences between objects only within a limited range to produce related sounds. The system may automatically determine which objects in an image are similar for review by the user. The user has the option to accept or reject the automatic determination which is used for the analysis and sonelization as described hereinabove.

Family reunion pictures at a Fourth of July picnic or Christmas gathering would have commonality but distinct sounds because the subjects may have similar dress, color of background and decorations, but the faces and body shapes, and number of subjects would create difference when the pictures are sonelized.

A counterfeit painting may have a sound different from the original because of discrepancies in brushwork, paint pigment reflection, age, etc. A convincing counterfeit may sound really close to the sound of the original. This may require that the image be scanned using infrared or x-ray or raking light rather than a "straight" scan of normal light.

Similarly text such as poetry, literature, or virtually any text may be scanned and treated as an image and proceed as above with sonelization. Poetry could become lyrics to music or literature could be accompanied with user chosen sounds. Shapes of letters or clusters may be treated equivalently to how a complex drawing may be treated. Shapes of letters, length of words and spaces between may be used determine the soundtrack. The choice of font, bold and/or italicized text may be used for volume and rhythm in the analysis.

For all of the above, as with all uses, the program may give user the ability to "dial-in" or "dial-out" from the initial version of the soundtrack. The program may, if the initial soundtrack version is retained, narrow or expand the differences or be semi-randomized and rerun until the user is satisfied or feels the soundtrack is ready, or may be further refined though the use of separate sound editing software.

Referring to FIGS. 46-49 the user can start with a group of 'everyday' images such as a pickup truck, a bowl of fruit, a bathroom, and a cloud-emphasized landscape photograph. The images may be unrelated, or may be meaningful as a collection to the user, or the user may simply have grouped the images together to form a relationship.

Figure 49:
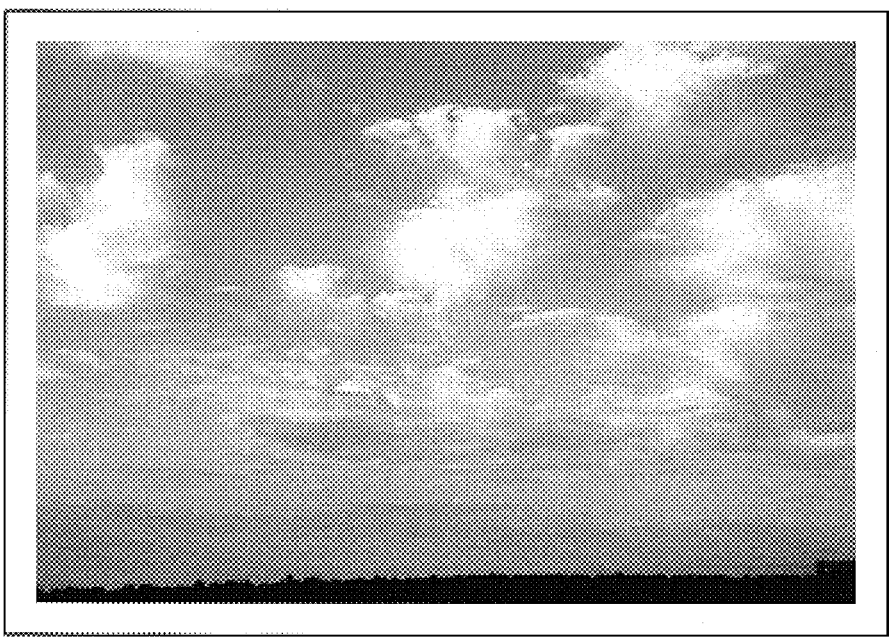

In the first case where the user considers the images unrelated, each is analyzed by the software with or without various, available user-defined settings. For example, the user may want the length of the sound associated with each image to be the same, and may want the type of sound to be similar—whatever the user considers the appropriate 'everyday' sound group, or that each image's sound is developed using individual sound groups—for example: machine sounds (FIG. 46), domestic sounds (FIGS. 47 and 48), or majestic sounds (FIG. 49). The software may be set by the user according to the preceding selections to scan each image and generate the sounds.

In the second case where the user considers the images related, each is analyzed by the software using more or less of the available user-defined settings. For example, the user may decide only that all four images sounds are to be generated from the same family of sounds such as from the 'people' sound group rather than the 'nature' or 'orchestral' sound group. Or, the user may want to have the software determine the similarities among the images; for example, curved shapes or average gray-scale values or linear qualities, and then approve or further modify the resulting sound. For example, the relative amount of the determined or selected similar quality in each image may determine the intensity of the sound for each image within the chosen sound group, or be the measure of the amount of the use of the common sound group within each image's soundtrack, and the remainder determined by other individual image qualities. The user may decide that each image appears to be coming forward out of the image frame, and thus has an aggressive aspect, and use a sound group from the sound library that the user considers aggressive. Or, the user may choose to use some of the software's graphic tools to outline related shapes, for example all curved shapes, or all red shapes, or all light valued shapes, and then have the program base its sound determination upon those choices.

Contemporary fine art video is often a "collage" of imagery. This software allows the user to have and attach a collage of sound that is exclusive to the originating image(ry).

For video, what changes from scene to scene may be used to derive the sound. A relatively static scene may have main characters providing most of the image variance through changes in their positions or relative size or percentage of the frame. An overlapping soundtrack (concurrent with a background soundtrack) based on the character movement from frame to frame may be used to provide most of the variance in the sound. In one use the overlapping track could emphasize or play off of the background track. In another use, the background could be developed completely independently.

Even with just one tone/volume combination from each frame, the user may determine that there is too much sound information (at say 24 frames/sec) and the sound would be confusing or too complicated. The user may have the option to undersample the video at one-half, one-third or one-fourth the frame rate per second, for example. Since there are times when the scene changes abruptly between two adjacent frames, the program may provide the flexibility to manually analyze the two frames and perhaps reset the interval from that point going forward and backward.

A video may add a time element to the program's use of static images. Each frame of the video may be treated both individually by the program as a series of static images, and to consider the series of images as a related whole.

A consideration may be the rapid accumulation of data, and the ability of a given version of the software and hardware to handle the data. A reduced level of detail in evaluating each individual frame and the ability to analyze generalized and specific similarities and differences among frames and groups of frames may be part of the analysis.

Figure 50:
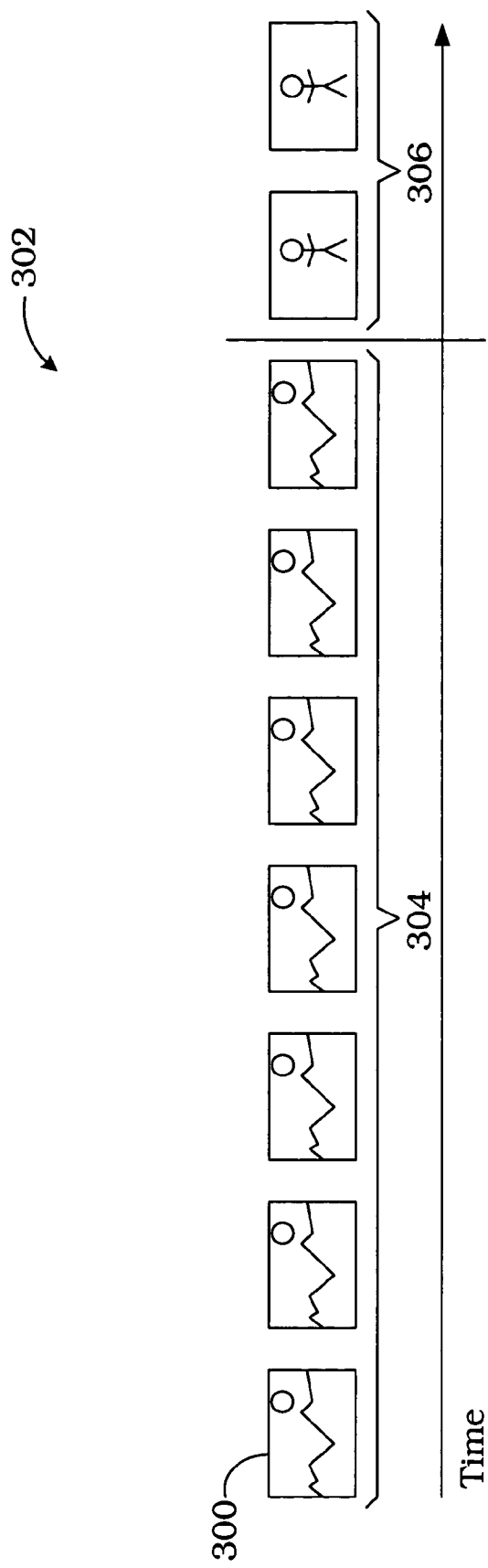
FIG. 50 is an illustration of digital video frames.

Referring to FIG. 50, each frame 300 in a group of frames 302 of a given section of the video may be given a quick or overall analysis in a low-resolution analysis setting as determined by user. There may be similar frames 304 in a series of frames, followed by a rather abrupt change in imagery to the next set of one or more frames 306. The first images 304 may generate identical sonels, or very similar sonels. The user may emphasize or de-emphasize the differences among similar frames. At the abrupt change the sonel may change abruptly or transition subtly as determined by program and adjusted by user. After the abrupt change, the next group of similar frames 306 may have their own similar sonels, and later be adjusted to a user-selected relationship to preceding 304 and following (not shown) frame groups. Depending upon the amount of data, number of frames analyzed together, the program may perform various analyses without sound output, and output occurs at the end of a possibly extended series of analyses. Upon completion, the user can listen to the rough sound output and make individual frame-by-frame adjustments.

In the same example, the time element, or length of the sound or sonel associated with each frame is determined. In a default mode, each frame's sound may have a length equal to the length of time the frame is displayed as the video plays. In television broadcast terms, a range of 25 to 29.97 frames per second is standard depending upon the broadcast format used. Thus, using every frame for an individual sound may not be practical. The program may have the option of a user-determined number of successive frames to be averaged for a single sound, while the program would still be able to identify significant break points, regardless of the user-determined number of grouped, successive frames.

Simplified software for educational setting may be used utilizing elements from above. While we are thought of as 'visual creatures', we may miss a lot if we place too much emphasis on the visual, or the literal visual. Absorbing visual information in a less literal way (noticing the lines and contrasts of a snowy fence as opposed to simply noting 'that's a fence') yields alternate, sometimes more information. The further abstraction of the visual image into sound furthers this process and opportunity for understanding.

Current media, products, advertisements, and societal direction trend toward domination by video and visual; this invention promotes more consideration of the audible. Oftentimes in art history lectures, music analogies are used in critical discussions: terms such as rhythm, harmony of forms and color passages from one area to another of the artwork. This invention provides an educational tool along those lines actually using sound/music to provide another method of analysis. In addition to "look!", the instructor can say "listen!".

A handheld device with built in digital camera and computer may have analysis software built in that would provide real time sonelization of a subject or scene as encountered directly by the user. Kids could taunt each other by how their appearance sounded. Cell phone users could create their own signature phone ring. "On hold music" may be customized based on receptionist, or scene, for example.

Using presets, (determined by convention) visually impaired persons could experience a scene or person's appearance and then have a basis of comparison when scanning the same person or scene or when encountering the next person or situation. Visually impaired persons could have a recording of their experience to share with others who are also visually impaired and those who are not.

Using presets, a museum could scan all of its artwork and along with a verbal description, the works could have musical/sound interpretations that would help emphasize what is considered important about each work. Museum organizations could agree upon presets so that for example French Impressionist, Abstract Expressionist, Pop Art, etc., would have consistent sound from one museum visit to another.

Predefined shapes of pixels may be sonelized specifically. The user may be audibly alerted with specificity when one of the shapes has been identified from a camera image, for example. This allows user to be visually assisted, without the user actually having to be in constant visual contact with the surveyed scene or monitor. A portable device may be used to scan a scene, therefore leaving the user free for other activity. Scan analysis may be in the visual and non-visual spectrum.

Using a preset sonelization set by convention for various visual symptoms (skin discoloration, musculo-skeletal deformity, weight loss/gain, etc.) a patient may be scanned or a photo may be entered into a computer and his/her image(s) would produce music/sound that would become a baseline. Subsequent visits would indicate changes, or progress on treatment, based on changes in soundtrack.

It should be understood that while a certain form of this invention has been illustrated and described, it is not limited thereto except insofar as such limitations are included in the following claims.

Having thus described the invention, what is claimed as new and desired to be secured by Letters Patent is:

1. A method for interpreting an image into sound comprising:
   receiving an image,
   selecting a scan order,
   selecting a scan resolution,
   scanning said image according to said scan order and scan resolution to provide a plurality of scanned elements,
   assigning a value to each scanned element,
   identifying brush strokes in said scanned image and associating a rhythm to each of said brush strokes,
   converting each value assigned to each scanned element to a sound element, and
   arranging said sound elements to produce a sound track.

2. The method as set forth in claim 1 wherein said assigning step includes assigning a color value and/or a grayscale value to each sound element.

3. The method as set forth in claim 1 further comprising identifying objects in said scanned image and assigning an object value to each identified object.

4. The method as set forth in claim 3 wherein said object value is an average of the object values of the scanned elements for the identified object.

5. The method as set forth in claim 1 further comprising identifying fields in said scanned image and assigning a field value to each identified field.

6. The method as set forth in claim 5 wherein said field value is the average of the scanned elements for the identified field.

7. The method as set forth in claim 1 further comprising identifying transitions in said scanned image and associating a tonal change to each of said transitions.

8. The method as set forth in claim 1 further comprising identifying texture variations in said scanned image and associating a rhythm or tone to each of said texture variations.

9. The method as set forth in claim 1 further comprising applying a plurality of filters to each of said scanned elements and combining sound elements for all filters for a scanned element.

10. The method as set forth in claim 1 further comprising assigning a volume level based on the brightness of a scanned element.

11. The method as set forth in claim 1 further comprising assigning a related range of sounds to similar textures and/or colors.

12. The method as set forth in claim 1 further comprising assigning a related range of sounds to similar identified objects.

13. The method as set forth in claim 1 further comprising assigning a background sound to said scanned image.

14. The method as set forth in claim 1 further comprising scanning said image to provide a negative image.

15. The method as set forth in claim 14 further comprising identifying objects in said negative image and assigning an object value to each identified object.

16. The method as set forth in claim 1 further comprising applying color filters to said scanned image and assigning a value for each color filter applied to each scanned element to provide color layers and associated sound elements.

17. The method as set forth in claim 16 further comprising combining said sound elements from each color layer.

18. The method as set forth in claim 1 wherein said scanned image includes text.

19. The method as set forth in claim 1 further comprising repeating each of said steps for a plurality of images grouped together in a sequence and producing a sound track for the image group.

20. A method for interpreting a plurality of images into sound comprising:
receiving a plurality of images,
selecting a scan order for each image,
selecting a scan resolution,
scanning each of said image according to said scan order and scan resolution to provide a plurality of scanned elements for each image,
assigning a value to each scanned element,
converting each value assigned to each scanned element to a sound element,
identifying brush strokes in said scanned images and associating a rhythm to each of said brush strokes,
identifying changes from each of said images to the next image, and
arranging said sound elements to produce a sound track.

21. The method as set forth in claim 20 wherein said assigning step includes assigning a color value and/or a grayscale value to each sound element.

22. The method as set forth in claim 20 further comprising identifying objects in said scanned images and assigning an object value to each identified object.

23. The method as set forth in claim 22 wherein said object value is an average of the object values of the scanned elements for the identified object.

24. The method as set forth in claim 20 further comprising identifying fields in said scanned images and assigning a field value to each identified field.

25. The method as set forth in claim 24 wherein said field value is the average of the scanned elements for the identified field.

26. The method as set forth in claim 20 further comprising identifying transitions in said scanned images and associating a tonal change to each of said transitions.

27. The method as set forth in claim 20 further comprising identifying texture variations in said scanned images and associating a rhythm or tone to each of said texture variations.

28. The method as set forth in claim 20 further comprising applying a plurality of filters to each of said scanned elements and combining sound elements for all filters for a scanned element.

29. The method as set forth in claim 20 further comprising assigning a volume level based on the brightness of a scanned element.

30. The method as set forth in claim 20 further comprising assigning a related range of sounds to similar textures and/or colors.

31. The method as set forth in claim 20 further comprising assigning a related range of sounds to similar identified objects.

32. The method as set forth in claim 20 further comprising assigning background sounds to said scanned images.

33. The method as set forth in claim 20 further comprising scanning said images to provide negative images.

34. The method as set forth in claim 33 further comprising identifying objects in said negative images and assigning an object value to each identified object.

35. The method as set forth in claim 20 further comprising applying color filters to said scanned images and assigning a value for each color filter applied to each scanned element to provide color layers and associated sound elements.

36. The method as set forth in claim 35 further comprising combining said sound elements from each color layer.

37. The method as set forth in claim 20 further wherein said scanned images include text.

* * * * *